United States Patent [19]

Matz

[11] Patent Number: 5,535,545
[45] Date of Patent: Jul. 16, 1996

[54] LAWN AND GARDEN EDGING SYSTEM

[76] Inventor: Warren W. Matz, 882 U.S. Hwy. 1, Juno Beach, Fla. 33408

[21] Appl. No.: 435,891

[22] Filed: May 5, 1995

[51] Int. Cl.$^6$ .................................................. A01G 1/00
[52] U.S. Cl. .................................................. 47/33; 52/102
[58] Field of Search ...................... 47/33; 404/7, 8; 52/102

[56] References Cited

U.S. PATENT DOCUMENTS

| | | | |
|---|---|---|---|
| 3,343,468 | 9/1967 | Schraudenbach | 47/33 |
| 3,387,786 | 6/1968 | Rynbertk . | |
| 3,415,013 | 12/1968 | Galbraith . | |
| 3,485,449 | 12/1969 | Wilson . | |
| 4,644,685 | 2/1987 | Tisbo et al. | 47/33 |
| 4,779,800 | 10/1988 | Tuomi . | |
| 4,945,675 | 8/1990 | Kendrick . | |
| 5,092,076 | 3/1992 | Terreta | 47/33 |

FOREIGN PATENT DOCUMENTS 3837815  12/1989  Germany ..................... 47/33

Primary Examiner—Terry Lee Melius
Assistant Examiner—Joanne C. Downs
Attorney, Agent, or Firm—McHale & Slavin

[57] ABSTRACT

The instant invention is a lawn and garden edging system which provides for a border device positionable adjacent walks and plant beds with provisions for the attachment of watering and lighting components. An insertion structure is provided which is inserted into the ground by use of a wooden handle placed into an aperture allowing an individual to stand on an upper end of the structure allowing the installer's weight to force the structure into the ground. The upper portion of the structure forms a passageway with apertures available for positioning watering components, electrical components may also be attached for connection to lighting products used to highlight trees, bushes or a home. A second embodiment of the invention provides a conduit for attachment to conventional extruded plastic edging dividers, the conduit provides the formation of a passageway for placement of the aforementioned watering components and electrical connections.

10 Claims, 26 Drawing Sheets

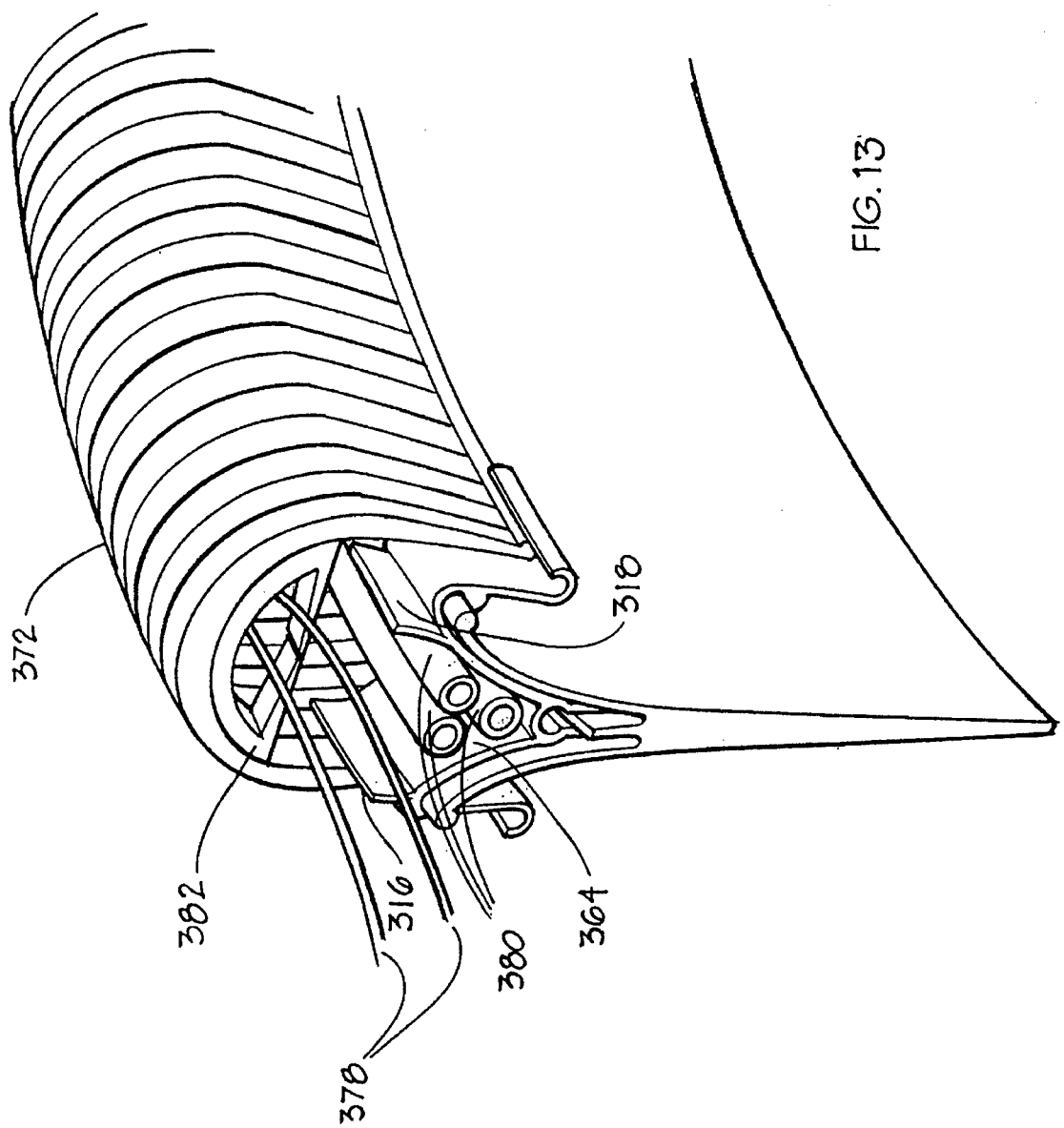

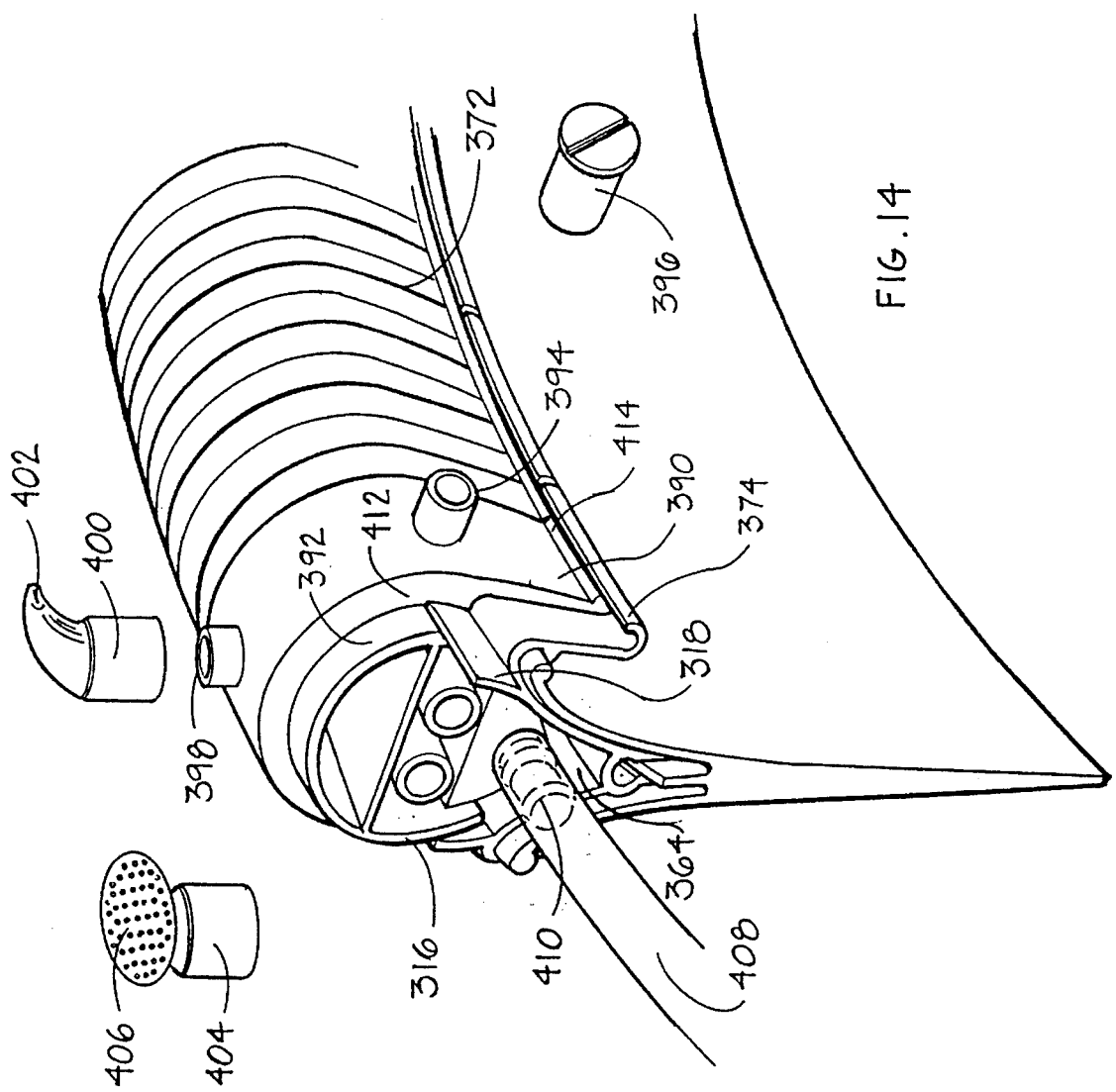

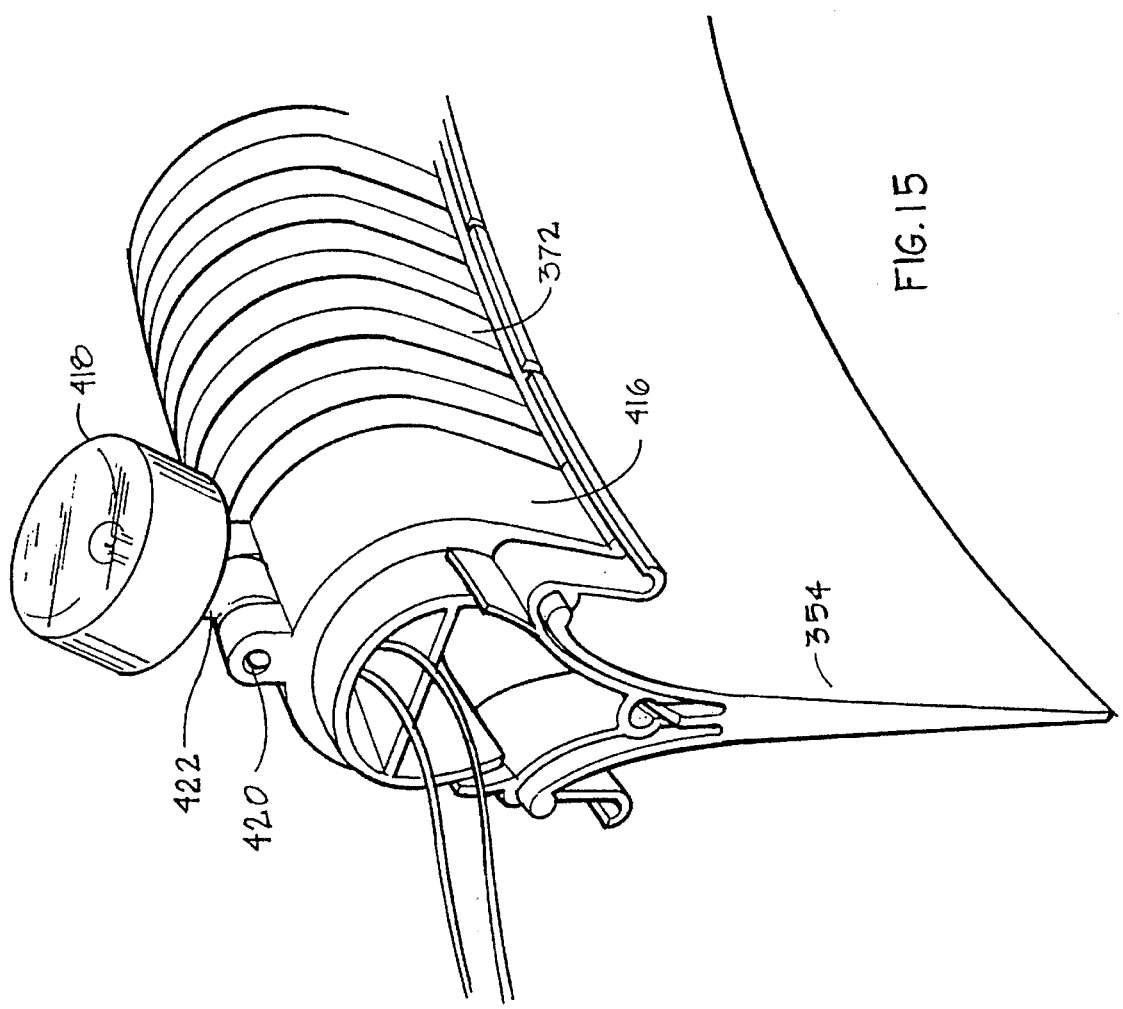

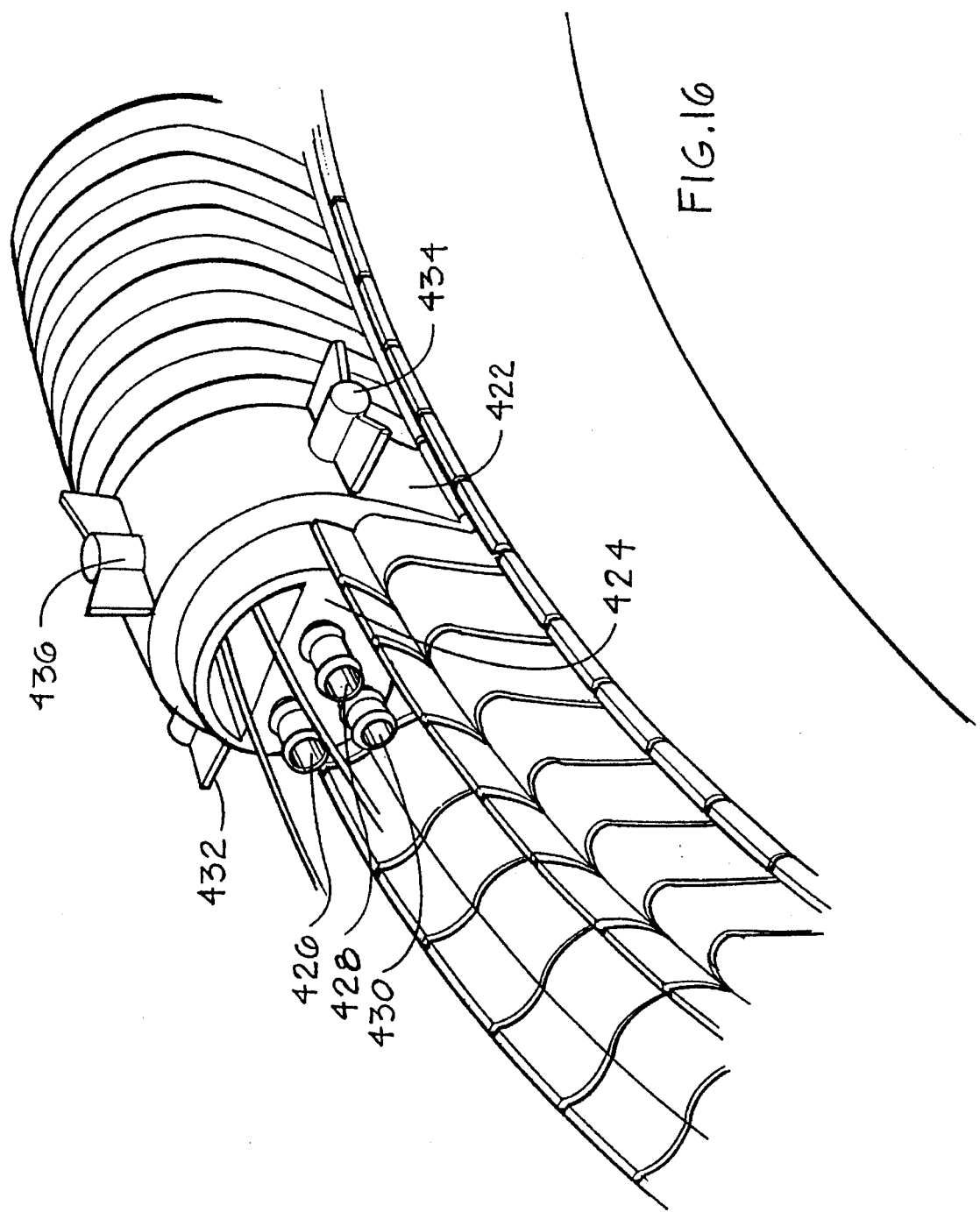

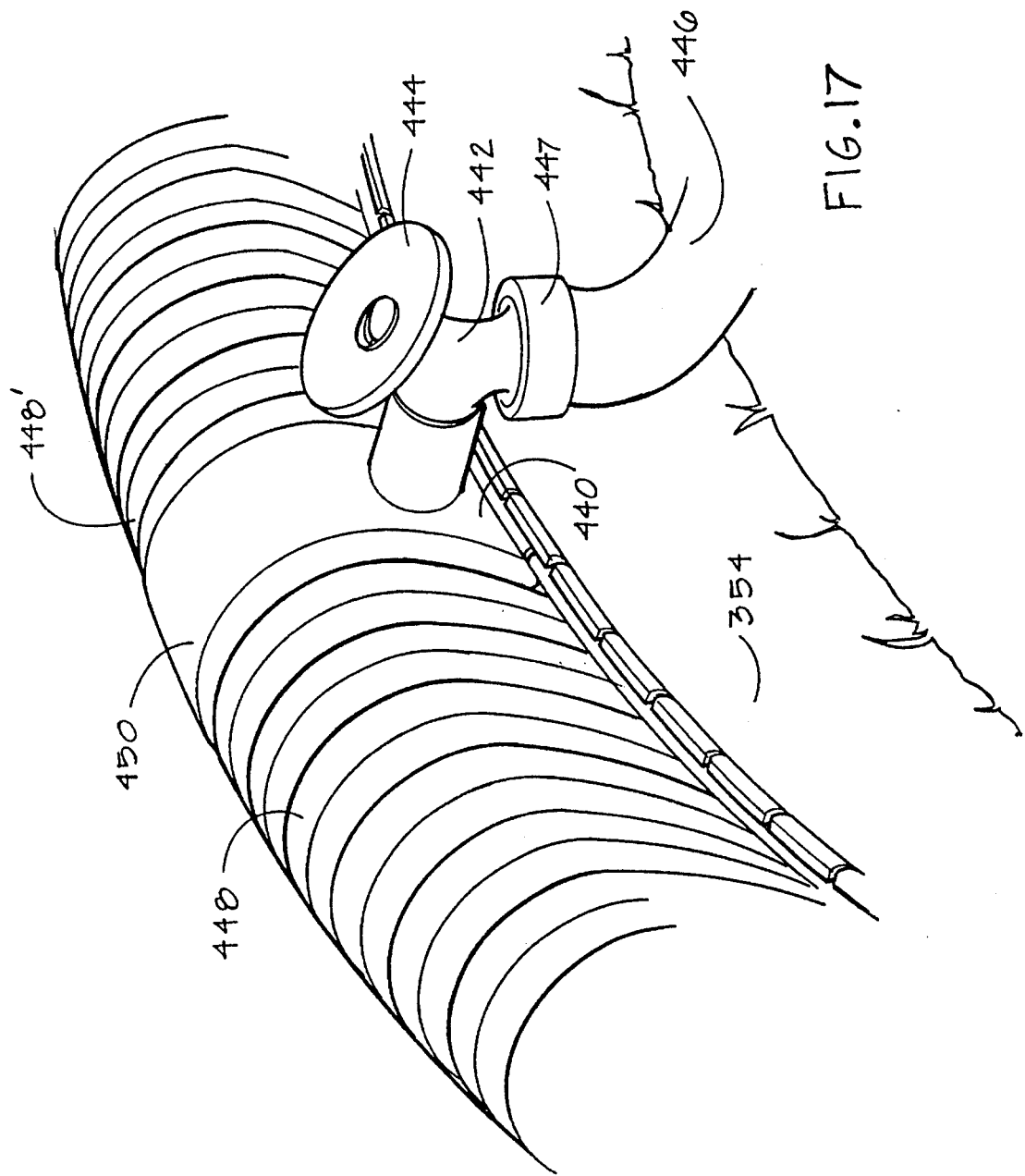

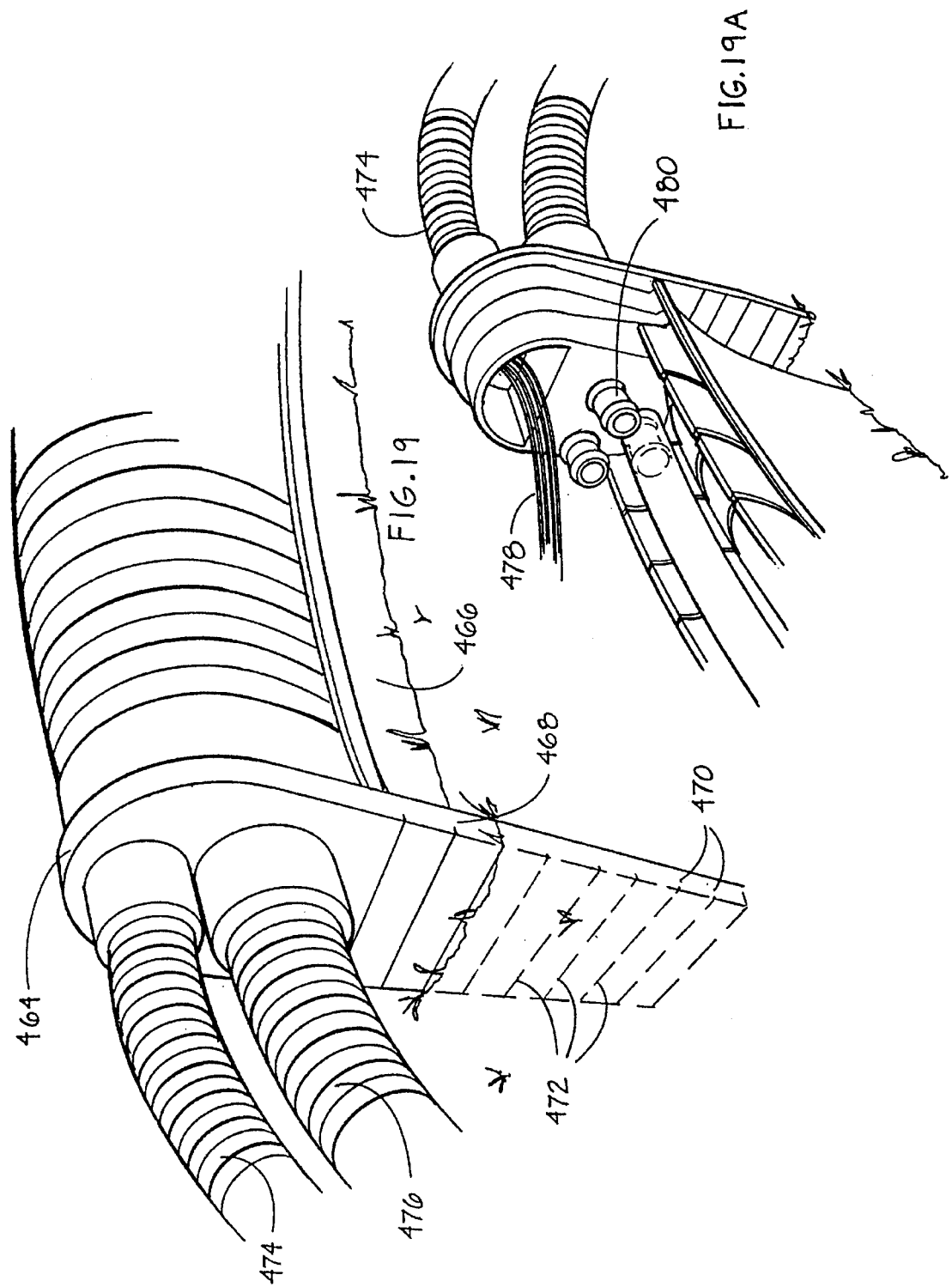

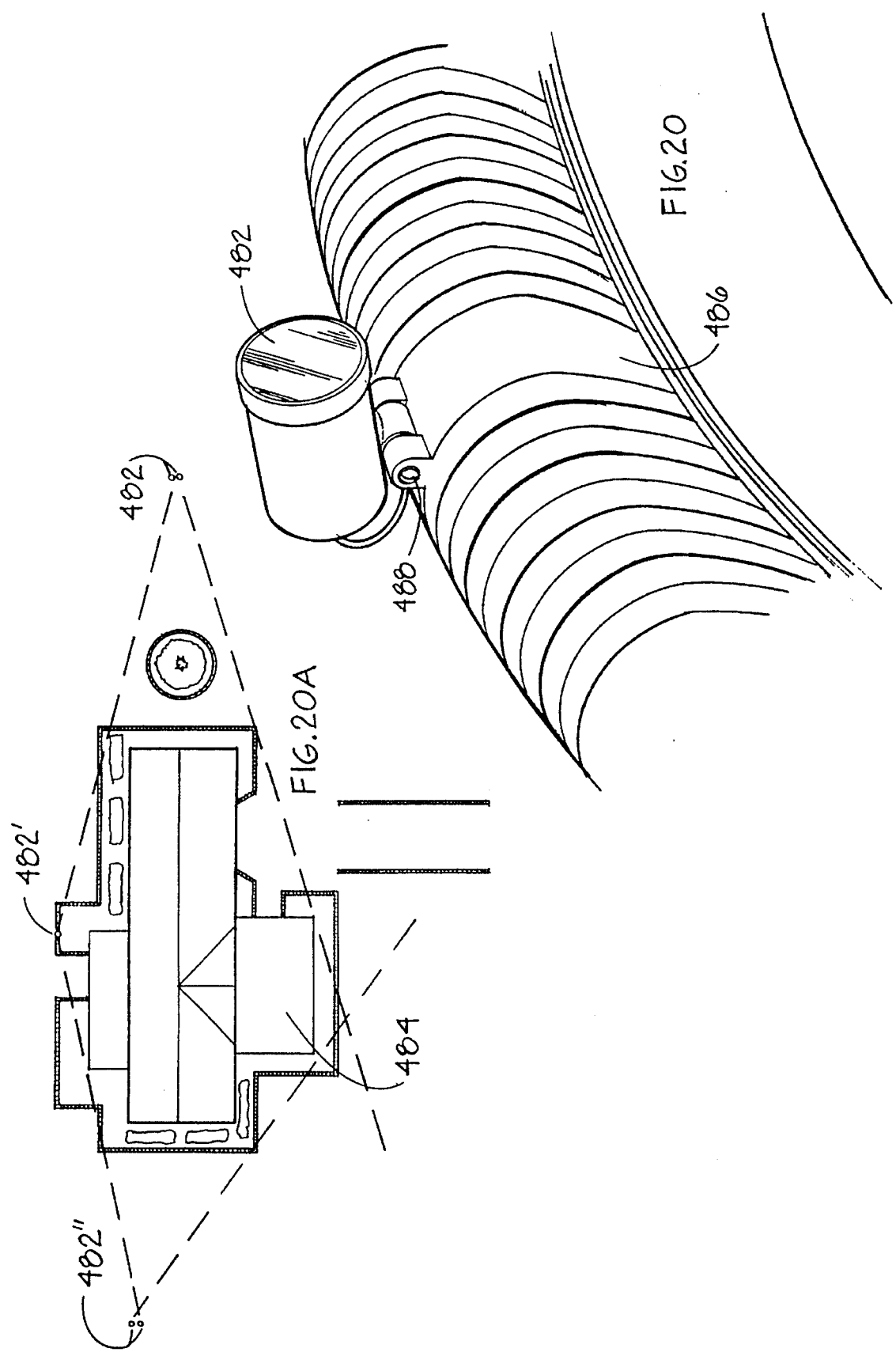

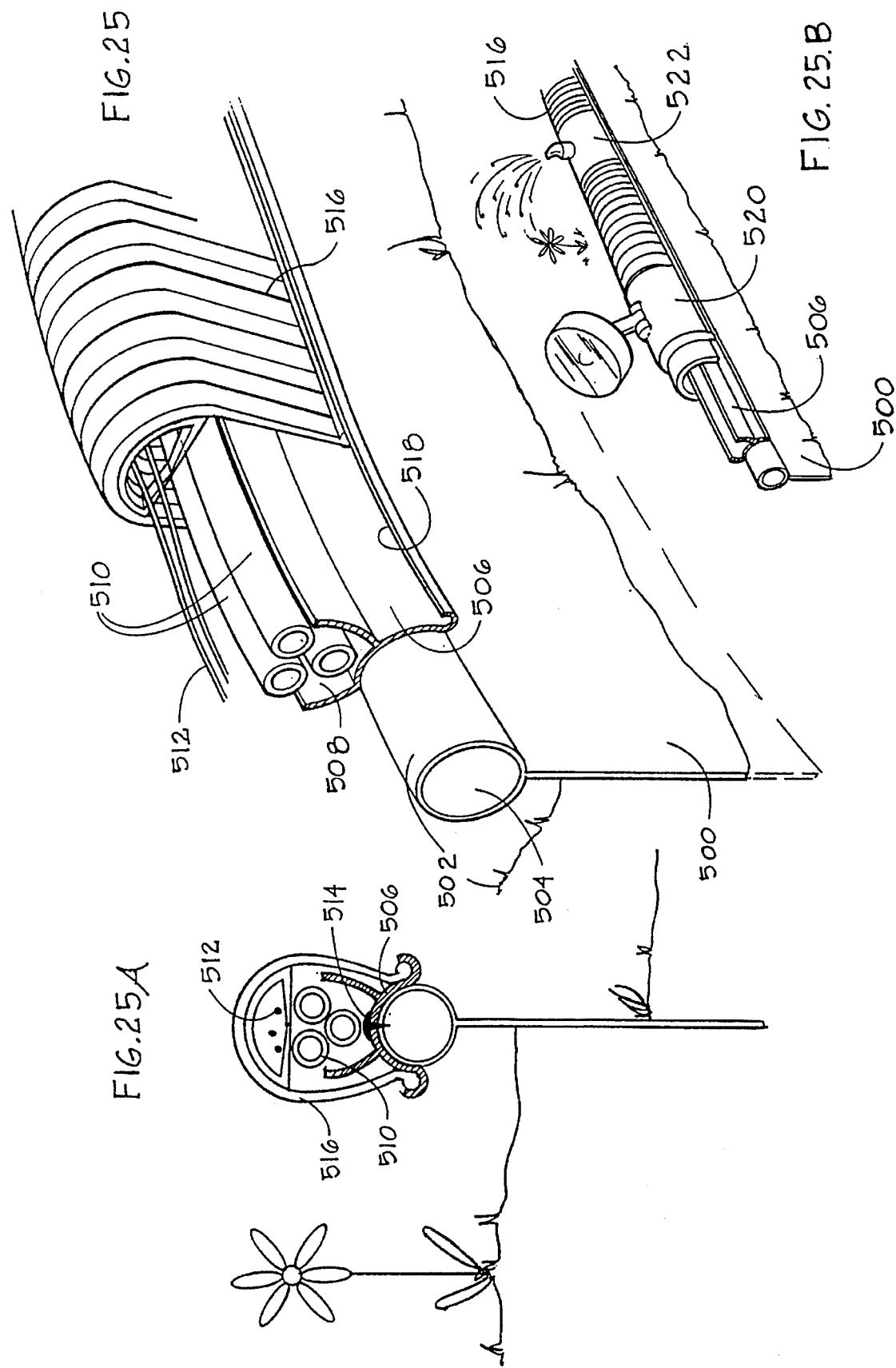

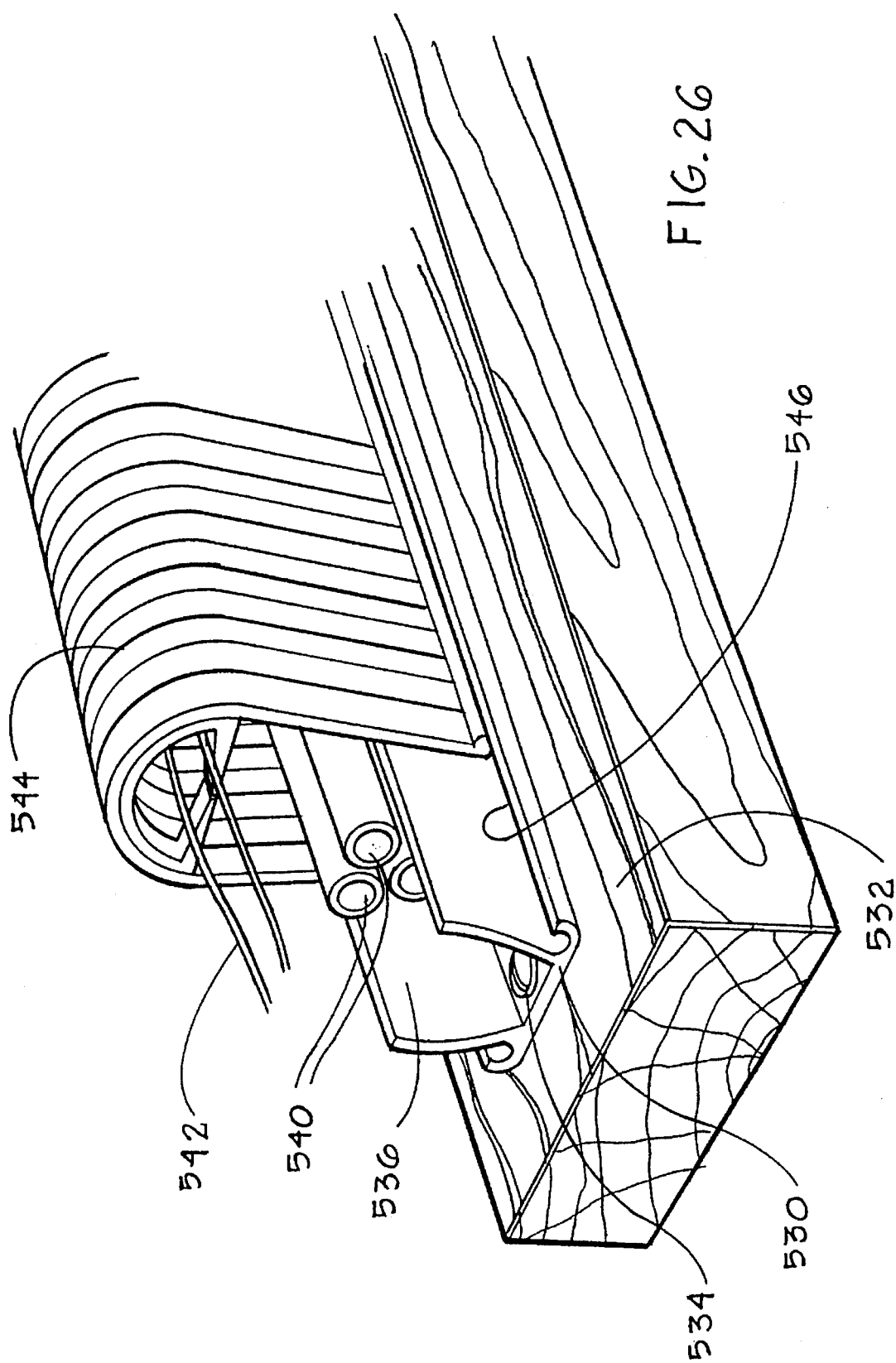

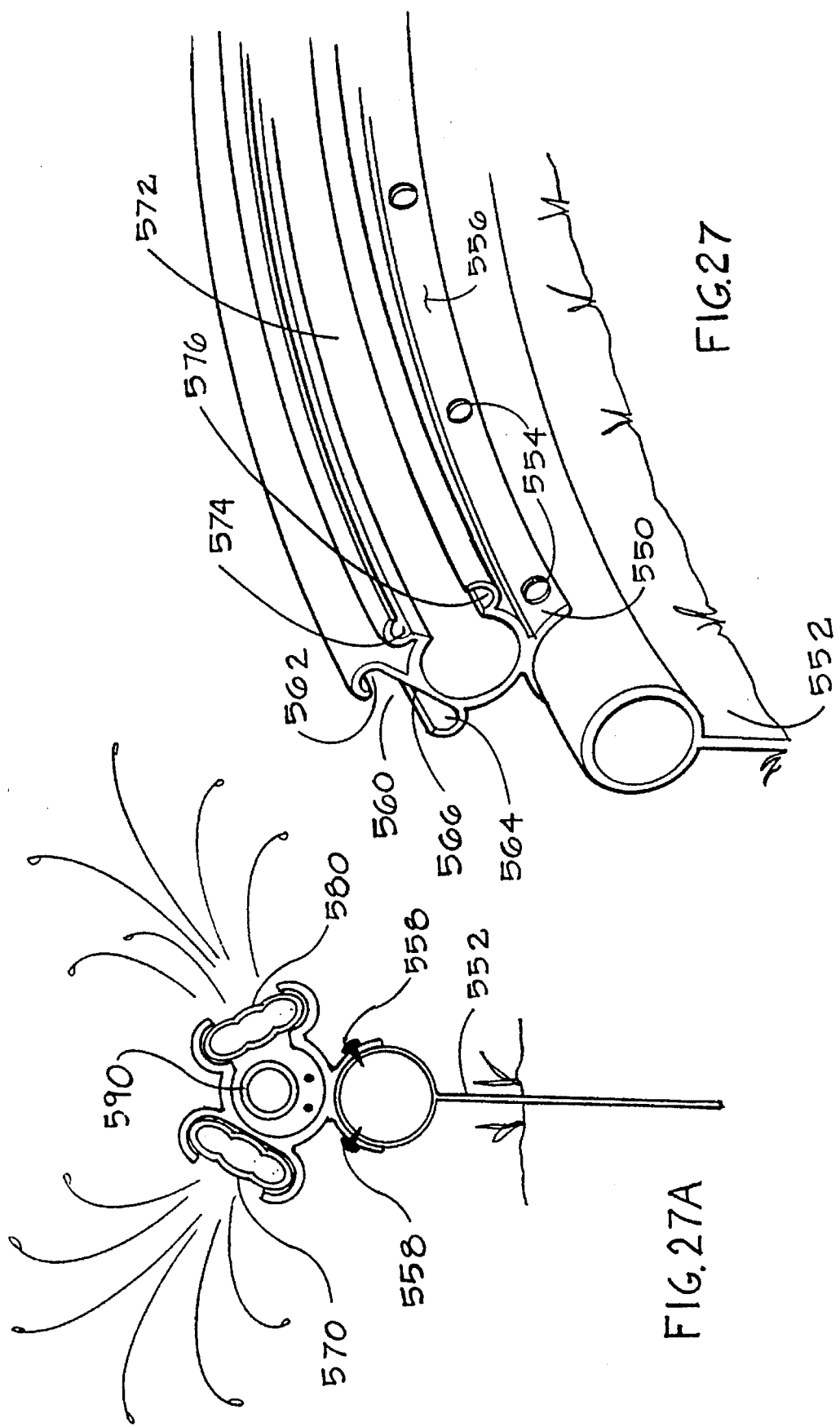

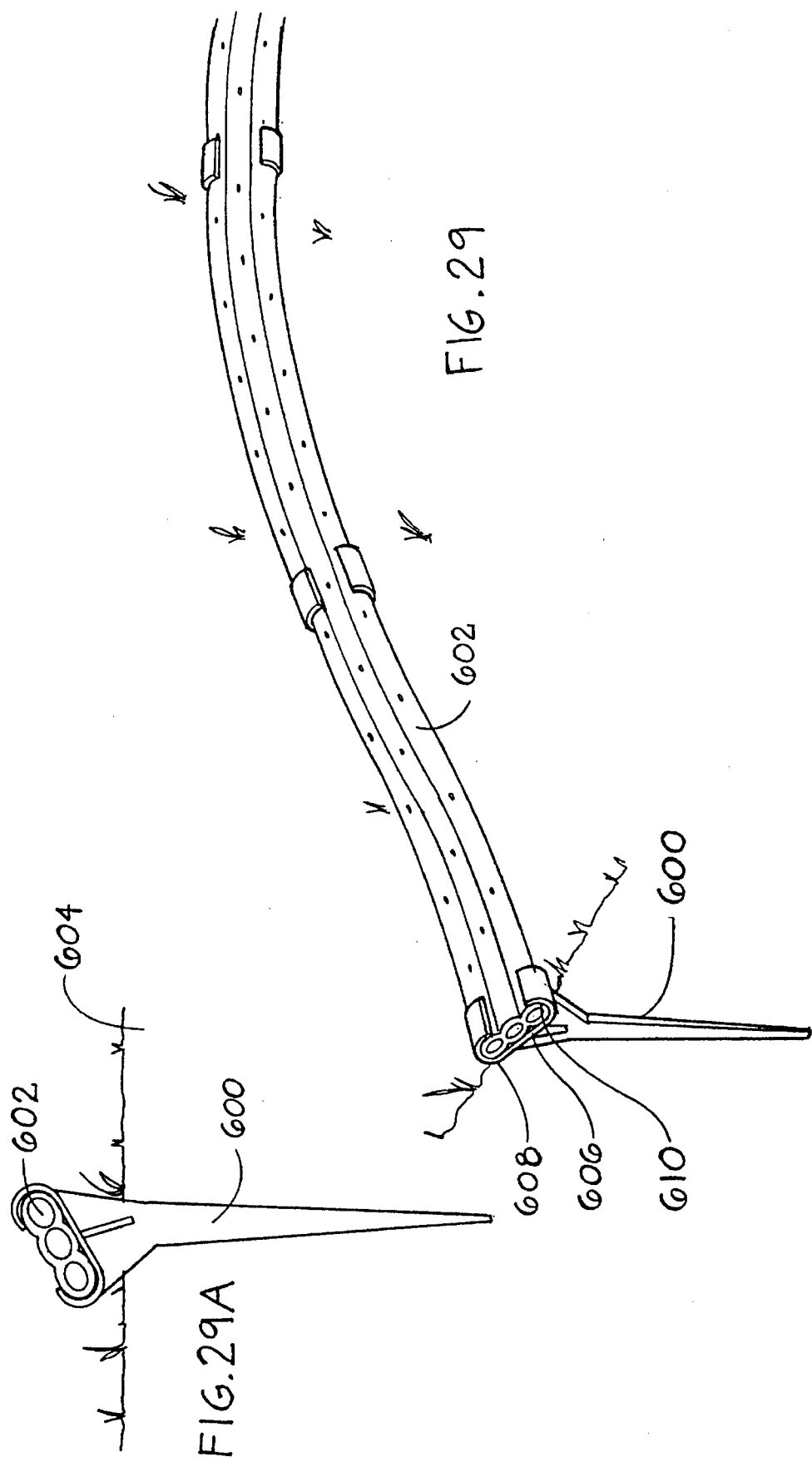

LAWN AND GARDEN EDGING SYSTEM

FIELD OF THE INVENTION

This invention relates generally to landscape maintenance and more particularly to a lawn and garden edging device for use adjacent borders of walks and plant beds with provisions for attachment of watering and lighting components.

BACKGROUND INFORMATION

Lawn edging devices are well known for their ability to restrict the growth of grass, weeds, or other vegetation by providing a barrier that extends above and below the ground level. Edging devices are particularly adapted for use along walkways, gardens and flower beds providing a distinct divider where desired. When properly installed, an edging device further provides an aesthetically pleasing border that enhances a lawn or garden.

Numerous types of edging devices exist. Typically an edging device consists of a plastic vertical barrier inserted into the ground at the point of demarkation. The insertion depth of the vertical barrier is approximately two inches to inhibit the natural progression of root growth. Anchoring of the vertical barrier is made possible by use of stakes or back filling. An upper portion of the edging device is enlarged to provide an aesthetically pleasing border line.

U.S. Pat. No. 3,415,013 discloses an interlocking edging device that is constructed from individual divider sections. This device incorporates a tongue and groove interlocking system allowing the formation of a straight border. This device lacks any ancillary function such as acting as a water conduit.

U.S. Pat. No. 3,387,786 sets forth an edging device including an enlarged upper portion forming a water conduit. A plurality of openings along the length of the conduit provides for the even distribution of the water. The conduit includes a downwardly extending flange which operates as a vertical barrier for insertion into the ground. A disadvantage to this device relates to the integration of a water conduit into the vertical barrier. Should the device be geographically placed where it is susceptible to a hard freeze, the device must be either drained or removed from the ground in order to prevent damage to the conduit. Even if the device is drained the conduit is directly exposed to the element, namely the UV light from the sun, which will weaken the conduit making it unreliable and susceptible to bursting.

U.S. Pat. No. 3,485,449 discloses another grass edging and watering device. The device includes an upper lip that accommodates lawn mowers, the lip extends outwardly allowing the wheels of a lawn mower to trim the grass adjacent the lip area. A water conduit is again integrated into the water edging device making it susceptible to freezing or other damage requiring replacement of the entire edging device should even a portion be damaged.

U.S. Pat. No. 4,779,800 discloses an above ground watering system. The device addresses some of the disadvantages of inground water systems by teaching an inexpensive device that can be easily repaired if damaged. A disadvantage is that it is not aesthetically pleasing and distracts from the area that it is designed to enhance.

U.S. Pat. No. 4,945,675 discloses a lawn edging device having integrated watering and electrical lighting components. This device predisposes the placement of the water and electrical components into the edging making it expensive to manufacture and inappropriate for use in areas where such components are not desired. As with the aforementioned prior art, this device may have problems in areas where a freeze should occur such as exposure to the elements or cutting by a lawn mower. Each section of the device is hollow and includes integral conduits for wiring and water requiring mating fittings in the ground so as to provide a continuous divider. If the edging device is one foot long then a fifty foot length has the possibility of leaky connections at fifty locations.

What is lacking in the art is a lawn and garden edging device for control of growth in landscapes with replaceable water and electrical components that can be serviced without removing the edging device from the ground.

SUMMARY OF THE INVENTION

The instant invention is an improved lawn and garden edging system consisting of edging, watering and electrical components. In addition, provisions are made for accommodating conventional edging strips to accept the conduit of the instant invention. The conduit provides a passageway for carrying water tubes and allows for the exacting placement of water sprinkler nozzles for directed, pattern, or shower type water distribution. The conduit further provides a passageway for electrical wiring allowing for the placement of discretely positioned illuminating lights or sensors along the length of the edging apparatus.

Unique to the invention is the ability to customize an installation to pinpoint water placement by use of components which readily snap in place. The instant invention allows for the replacement of individual water lines which may be constructed of low cost tubing, a cover provides UV protection and protection from the elements. If the edging is cut by a lawn mower, the tubing can be replaced without replacement of the entire edging apparatus.

In a primary embodiment an insertion structure is provided forming a base of the edging apparatus. The insertion structure is a wedge shaped rectangular piece of rigid plastic having an enlarged upper portion which narrows to a singular edge along a bottom end allowing for ease of insertion into the ground. An upper portion of the insertion structure is a centrally disposed vertical aperture used to assist in installation. The aperture accepts a broom stick handle allowing an installer to stand on the upper portion of the insertion structure wherein the weight of the person forces the insertion structure into the ground using the broom stick handle for balance. The combination operates in a similar form as a space shovel yet eliminates the need for digging and back filling a trench which can be destructive to flower beds.

Along one end wall of the insertion structure is a vertical groove with a vertical tongue disposed along a second end wall of said structure. This allows the joining of multiple structures in an interlocking basis with a tongue and groove configuration. In operation, an installer may position one insertion structure into the ground and a second structure may be placed adjacent to the first with each insertion structure operatively associated therewith allowing for the aligned placement of multiple insertion structures to shape a line, circle, angle or any other shape necessary to border a particular area.

The upper portion of the insertion structure includes a longitudinally disposed cutout which forms part of a passageway for water tubes and electrical wires. In addition, a plurality of vertical chambers are receptive to either water couplers or electric components along the passageway. Each coupler includes a lower body portion which situates into one of said vertical chambers. The water couplers allow for connection of the aforementioned water tubes with side outlets for connection to various watering nozzles. Water couplers may include unions and valve arrangements so as to control the flow and direction of water through the passageway. An end coupling provides a union for connection to a conventional garden hose for coupling to a water faucet such as those typically located on the side of a home. The passageway maintains the electrical wires in a raised position so as to prevent submersion of the electrical wires should a water tube be ruptured. Low voltage illumination lights may be placed along the length of the passageway with provisions for securement of the illumination device into one of the vertical chambers.

A flexible cover placed over the passageway protects the water tubes and electrical wires and provides an aesthetically pleasing edging apparatus of uniform shape with breaks only for positioning of the aforementioned water coupler and illumination lamps. It is noted that the water couplers and illumination lamp components are sized to assimilate the cover thereby maintaining the lines formed by the cover.

In a second embodiment the device is formed in the shape of a conduit for use with conventional edging. Conventional edging is defined by a length of flexible plastic typically extruded with an enlarged longitudinally extending top and a vertical barrier of nominal thickness depending therefrom. The barrier is inserted into the ground by first digging a trench allowing the flexible plastic to be placed approximately two inches into the ground with back filling of the trench to maintain the vertical barrier in an upright position.

The conduit is attached to the top of the barrier and is formed from a single piece of flexible plastic having a first and second member coupled together forming an upper portion and a lower portion. The upper portion forms a passageway along which the water tubes and electrical wires may be placed. The lower portion forms downwardly depending legs creating an inverted receptacle which couples to the top of the barrier. The conduit further provides a latch area receptive to placement of the cover. In this manner, the water and illumination couplers may be readily attached to the conduit with the cover operating as an enclosure for the passageway holding the electrical wires and water tubes.

Yet another embodiment of the instant invention is an enlarged version of the conduit having a lower section capable of engaging oversized tubular tops. This conduit maintains the qualities of the aforementioned embodiments by provision of a passageway for placement of water tubes and electrical wires. As with the aforementioned embodiments a cover is attached to the conduit providing rigidity to the flexible member and operating as a protective enclosure for the water tubes and electrical wires providing an aesthetically pleasing design with illumination or water coupling sections discretely placed as necessary to accomplish their desired task.

Yet another embodiment of the instant invention is to provide conduit for placement about the opening of a garage door using a cover which assimilates the edging system as previously described. In this embodiment the conduit placed around the opening of the garage operates to hold water tubes for directing a spray of water at a vehicle either leaving or entering the garage. This concealed watering apparatus allows a vehicle to be rinsed so as to remove lightly attached elements. For instance, in the desert southwest cars are coated with grit that, unless rinsed from the finish, will eventually damage the finish. Along the coastal regions vehicles are constantly subjected to a salt spray that, unless rinsed from the finish, will eventually damage the finish. Cars residing in the northern states necessitates that road salt is removed from the finishes. This embodiment allows a rinsing system that will match a lawn and garden ending system.

Thus, an objective of the instant invention is to provide an inexpensive edging apparatus that provides for custom installation.

Still another objective of the instant invention is to provide an accessible passageway for placement of water tubes and electrical wires further allowing for the installation of water nozzles and illumination lamps to accommodate a particular situation.

Still another objective of the instant invention is to teach the use of an insertion barrier that is placed into the ground in a similar format as a spade shovel by use of a handle placed into a chamber along an upper portion of the insertion device allowing a person to stand on the upper portion using their body weight to assist in the insertion.

Yet another objective is to teach the use of various watering and electrical components that couple to the device providing a unique ability to customize a divider placing such components only where desired.

Yet another objective of the instant invention is to teach the use of a removable cover to allow replacement of damaged components without disturbing the edging component installation.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2A is a top view of the insertion structure;

FIG. 3A is an end view of FIG. 3;

FIG. 3B is an exploded view of a water coupler used in FIG. 3;

FIG. 4A is the water coupler used in FIG. 4;

FIG. 5A is the electrical hanger for use within the cover;

FIG. 8A is an exploded view of an illumination lamp;

FIG. 11A is a perspective view of the conduit placed on a V-shaped divider;

FIG. 11B is a separated piece of conduit place on a V-shaped divider;

FIG. 13 is a perspective view of a V-shaped divider with water tubes and electrical wires placed in position;

FIG. 14 is a perspective view of a conduit placed on a V-shaped divider having water tubes, electrical wire and cover installed;

FIG. 15 is a conduit placed on a V-shaped divider with an illumination lamp installed;

FIG. 16 is a perspective view of conduit placed on a V-shaped divider with a manual adjustable water coupling;

FIG. 17 is a perspective view of a manual control valve placed along a side surface of a conduit;

FIG. 19 shows an end piece having a perpendicular placed flange along an end of a divider;

FIG. 19A is a perspective of FIG. 19 in a reverse manner with the cover removed;

FIG. 20 is a perspective of a conduit cover with a sensor attached;

FIG. 20A is a pictorial view of placement of sensors in a residential application;

FIG. 25 is a perspective view of a third embodiment of the instant invention;

FIG. 25A is an end view of FIG. 25;

FIG. 25B is a pictorial illustrating components of the third embodiment with an illumination light attached;

FIG. 26 is a forth embodiment of the invention having a conduit for attachment to flat surfaces;

FIG. 27 is a fifth embodiment of the instant invention having a conduit capable of holding a flat garden hose;

FIG. 27A is an end view of FIG. 27;

FIG. 29 is a stake for use with flat garden hoses; and

FIG. 29A is an end view of FIG. 29.

DETAILED DESCRIPTION

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
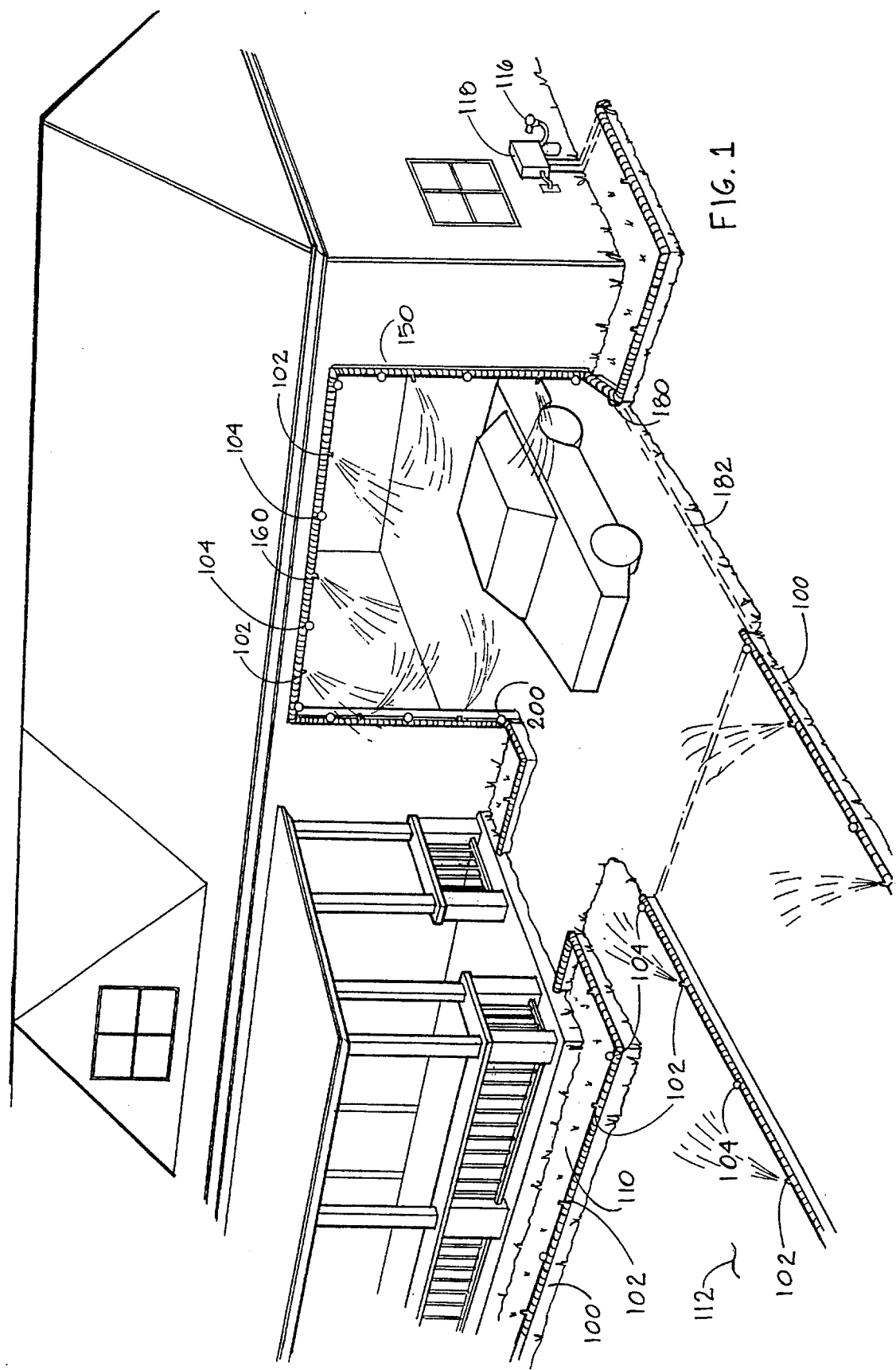
FIG. 1 is a pictorial view of a residential home with the edging system of the instant invention installed.

Now referring to FIG. 1, shown is a pictorial view of a residential address having the various embodiments of the instant invention installed. By the way of illustration, a home is illustrated with a driveway, a garage and a home entrance. The edging device 100 of the instant invention is placed around the flower bed 110 with a plurality of watering nozzles 102 and illumination lamps 104 placed along an upper edge of the device.

The watering nozzles may be used for irrigation of the flower bed 110 wherein a side surface of the device separates the flower bed 110 from the lawn 112. It should be noted that a flower bed 110 may be simply separated from the lawn 112 by the device 100 or as shown enhanced by the water nozzles 102 which may be used to water the flower bed and/or the lawn. The driveway is shown bordered by the device 100 with a plurality of lights 104 used to illuminate the surface of the driveway. Water nozzles allow for the watering of the lawn on each side of the driveway or for rinsing of a car passing over the driveway. The edging device separates the driveway from the lawn 112 and may further include nozzles as previously described in order to irrigate the lawn area on either side of the driveway without placing water on the driveway.

Another embodiment of the edging device 150 may further surround the garage door wherein a plurality of nozzles 160 are used to direct a water spray at a vehicle for purposes of rinsing the vehicle when entering or leaving the garage. In this manner, the edging device provides a similar border as described for use about the flower bed and driveway and is most beneficial in areas where grit must be constantly rinsed off the vehicle to prevent harm to the finish. As will be described in more detail throughout this specification, the edging device provides the ability to place water and/or lights as well as common edging from a single water source 116 having a control system 118 with a plurality of automatic or manual valve systems allowing water to be distributed throughout the system utilizing separate legs. For instance, a tee 180 may be provide at the corner of the driveway with underground connection 182 in order to reach the edging device 100 found on each side of the driveway. A tee 180 may further allow connection to an edging 150 which is used to surround the entryway to the garage. The control system 118 may include a timer mechanism in order to provide sufficient pressure to individual areas. The car rinse may be operated on opening of the garage door by triggering of an infrared beam 200 as the vehicle enters or leaves the garage. The sensors are well known in the art and there use in conjunction with the instant invention can be valued by one skilled in the art.

Figure 2:
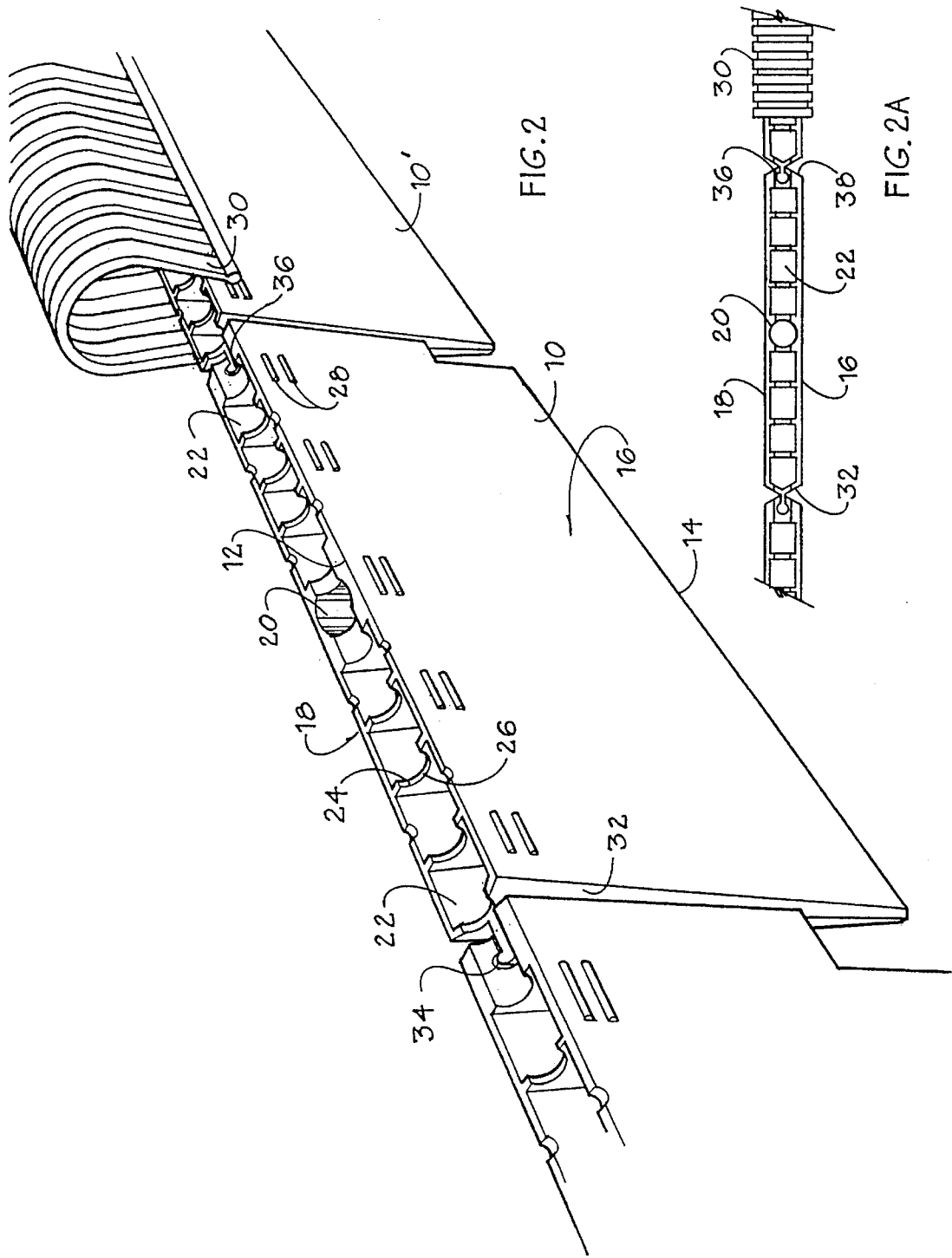
FIG. 2 is a perspective view of the insertion structure of the first embodiment.

Now referring to FIGS. 2 and 2A the edging device is formed by a divider 10 constructed from plastic and formed from an elongated structure having an enlarged upper section 12 and an insert blade 14 depending downwardly therefrom for insertion into the ground whereby the upper section 12 is located above the top surface of the ground. The divider 10 has a first side surface 16 and a second side surface 18 providing a tapered configuration leading from the upper section 12 to the blade insertion section 14. The upper section 12 includes a centrally disposed aperture 20 available for insertion of a circular handle such as a broomstick which allows the installer to place one end of the circular handle into the aperture 20 wherein the installer may then stand on either side of the aperture allowing his weight to force the blade 14 into the ground. The handle operates in a similar format to that as a spade shovel allowing the installer to balance himself on the upper portion while the divider 10 is being inserted into the ground.

On either side of the centrally disposed aperture are individual chambers 22 having separating side walls 24 with a horizontally disposed cutout 26 for placement of water hoses, as defined later in this specification. The chambers 22 allow for positioning of water in electrical coupling holders allowing the installer to provide connections anywhere along the length of the divider 10. Engagement tabs 28 are provided along side surface 16 and side surface 18, not shown, and are used to engage a cover 30 illustrated on divider 10'. The cover 30 is a rigid piece of plastic having limited flexibility. The divider 10 includes an insertion edge 32 which is chamfered allowing divider 10 to be placed at an angular offset to an adjoining divider 10' if so desired. The insertion edge 32 includes a tongue 34 which is insertable into groove 36 located on receptive edge 38.

Figure 3:
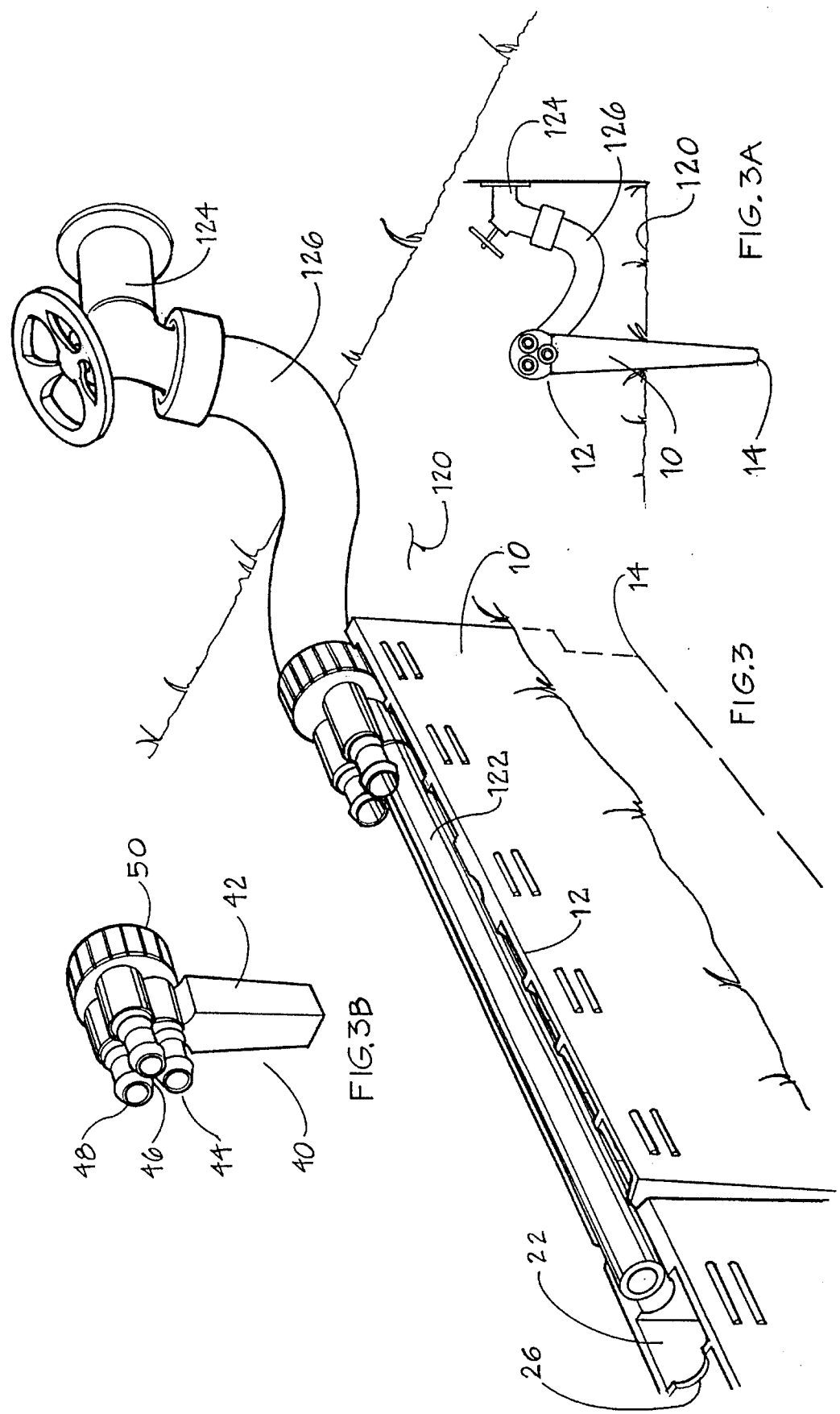
FIG. 3 is a perspective view of the insertion structure with a water tube.

Referring to FIGS. 3, 3A and 3B the device 10 is illustrated having the blade edge 14 placed in the ground 120 allowing the divider to work as an edging device separating vegetation on either side of the device. In this embodiment curvature 26 is shown in its positioning capability by placement of water line 122 along the upper portion 12. The water line 122 is coupled to water line coupler 40 having insert 42 available for positioning within aperture 22. The water coupler 40 includes individual water connections 44, 46 and 48 which are coupled to faucet 124 wherein a flexible hose 126 is positioned from the faucet to the hose coupler. The hose coupler includes a rotatable coupling 50 which accepts the insertion of the hose 126.

Figure 4:
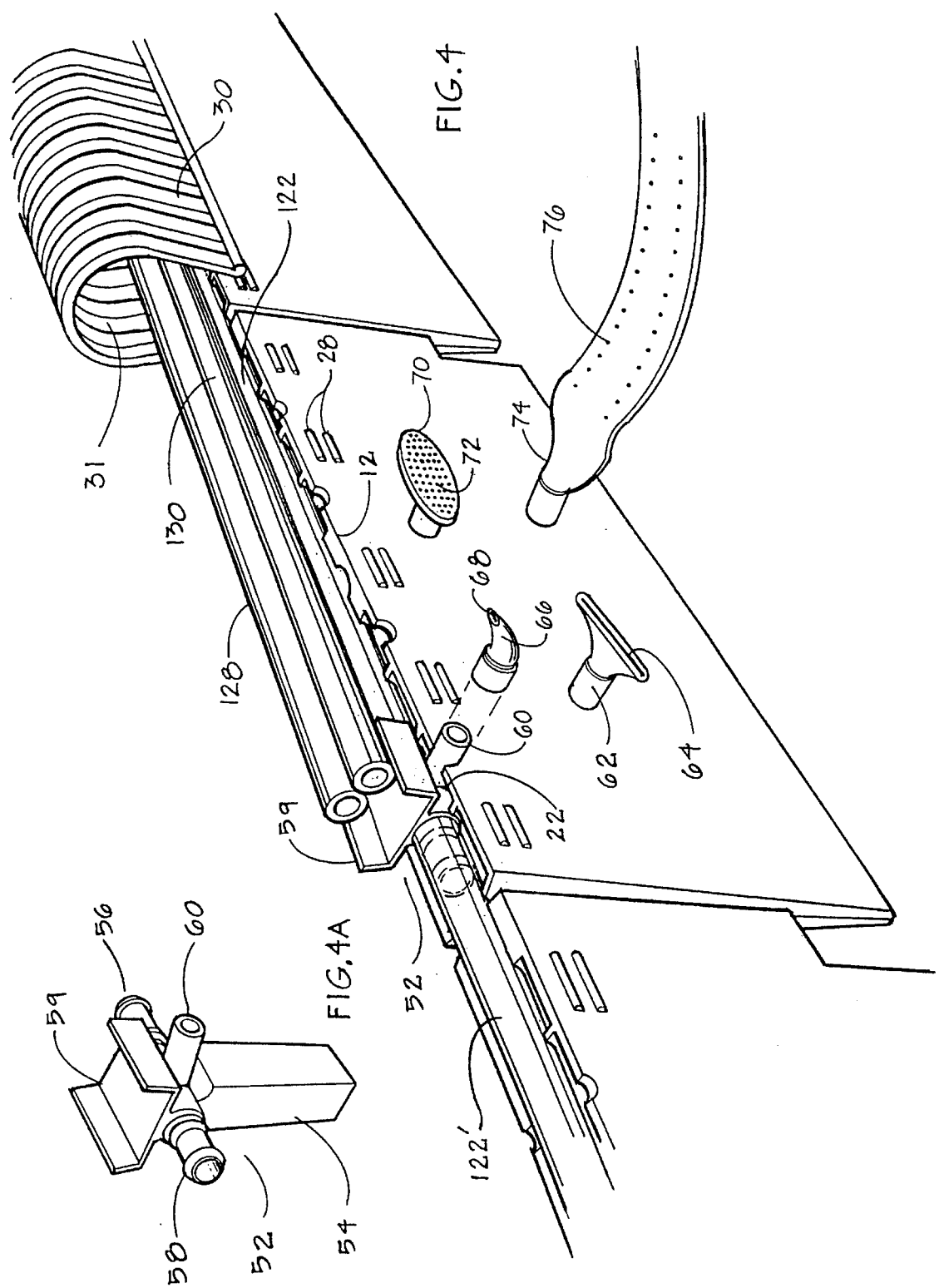
FIG. 4 is a perspective view of an insertion structure with multiple water tubes.

Now referring to FIGS. 4 and 4A the water tube 122 is shown in conjunction with a second 128 and third water tube 130 which is coupled to the aforementioned outlets 44, 46 and 48 respectively wherein the water tubes are positioned above the upper portion 12 and encompassed by cover 30 which fits within tabs 28. This partial view shows the water tubes and the meeting at a first water junction 52 having an insert body 54 insertable into chamber 22 wherein the free end of tube 122 is connected to the inlet 56 of the water junction 52 and a continuation of the tube 122' is coupled to the outlet 58 so as to maintain a steady flow of water through the tube.

The hose coupling 52 has a T-fitting 60 which accepts a variety of devices such as a spray nozzle 62 having a slit 64 capable of providing a wide spray pattern for lawns. Alternatively, a narrow nozzle 66 may be used having a small slot 68 providing a fine spray to allow water distribution over a distance. Yet another nozzle is the use of an enlarged shower nozzle 70 having a plurality of holes 72 providing for even distribution of water under low pressure useful in watering of gardens.

Yet another alternative for coupling to a tee outlet 60 is a hose 74 having a plurality of holes 76 available for sprinkling water over a distance such as flower beds, lawns, or any other particular area where a gentle flow of water is desired. The hose coupling 52 includes collector shield 59 which allows placement of hoses 128 and 130 in a secure manner above the hose coupling 52. It is noted that tubes 122, 128 and 130 do not encompass the chamber formed by cover 30 wherein an upper surface of tubes 128 and 130 are set a distance apart from an inner surface 31 of cover 30.

Figure 5:
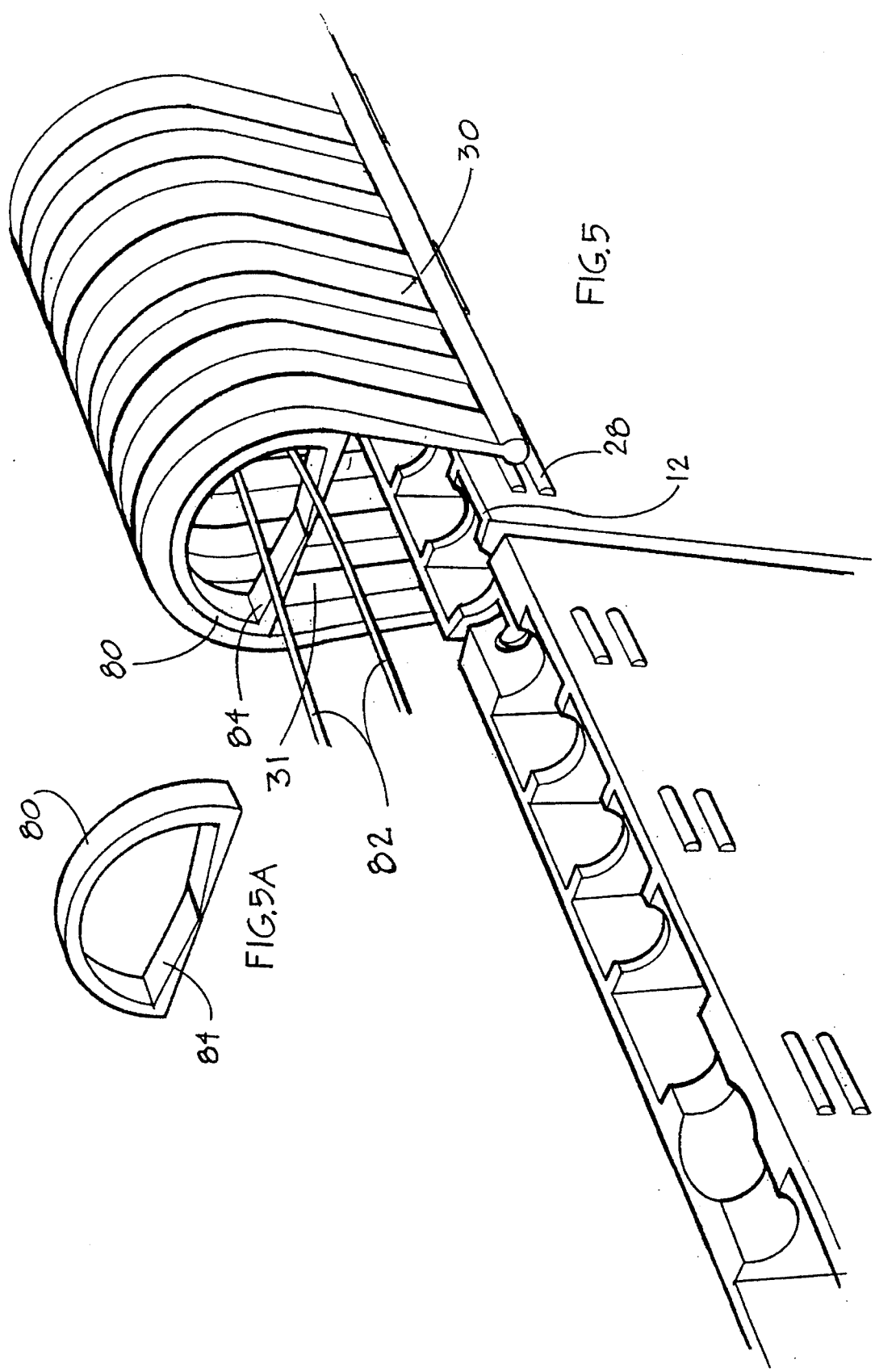
FIG. 5 is a perspective view of the insertion structure with a cover.

Referring to FIG. 5 and 5A snap ring 80 fits along the inner surface 31 of the cover 30 wherein a plurality of wires 82 may be positioned above the tubes, not shown. The snap ring 80 has a U-shape which conforms to the inner surface 31 of the cover 30 providing a lower support platform 84 which prevents the wires 82 from sliding around the side surface of the water tubes so as to prevent the wires from interfering with the cover or being pinched between the tubes.

Figure 6:
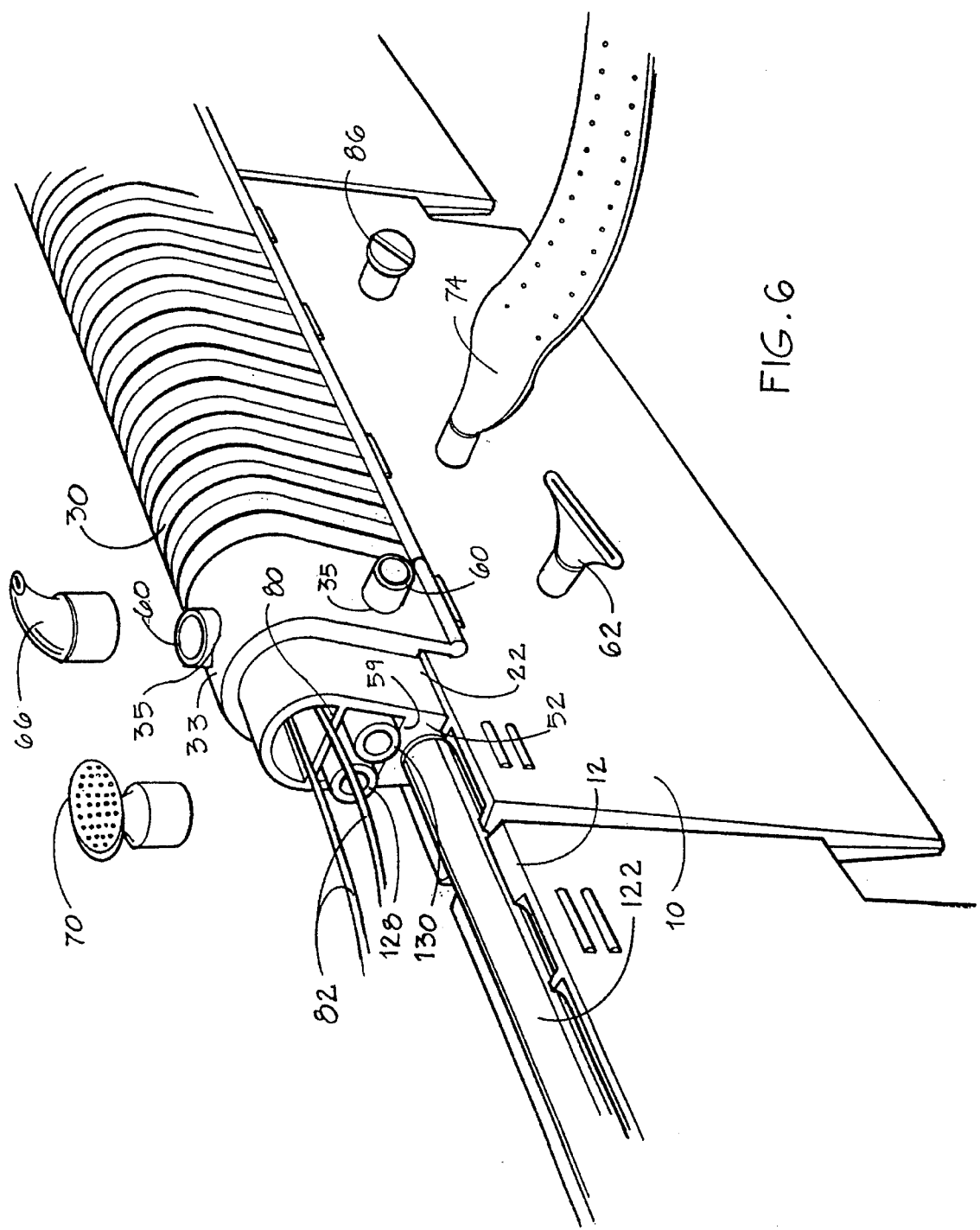
FIG. 6 is a perspective view of the insertion structure having the water tubes, electrical wires, and cover installed.

Referring to FIG. 6 a combination water and electrical conduit is provided with the device 10 having an upper portion 12 with the hose coupler 52 placed within aperture 22 having tube 122' extending outward from the hose coupler with tube 128 and 130 positioned upon support 59. The electrical wiring bracket 80 supports wires 82 above the tubes for use in electrical connections as described later in this specification. Cover 30 joins a modified cover 33 having an aperture 35 for placement of outlet 60 used for coupling to one of the aforementioned peripherals such as nozzle 62, hose 74 or a plug 86 installed into the outlet 60 allowing for the discontinuation of the water flow in instances where a nozzle or hose connection is not desired.

Figure 7:
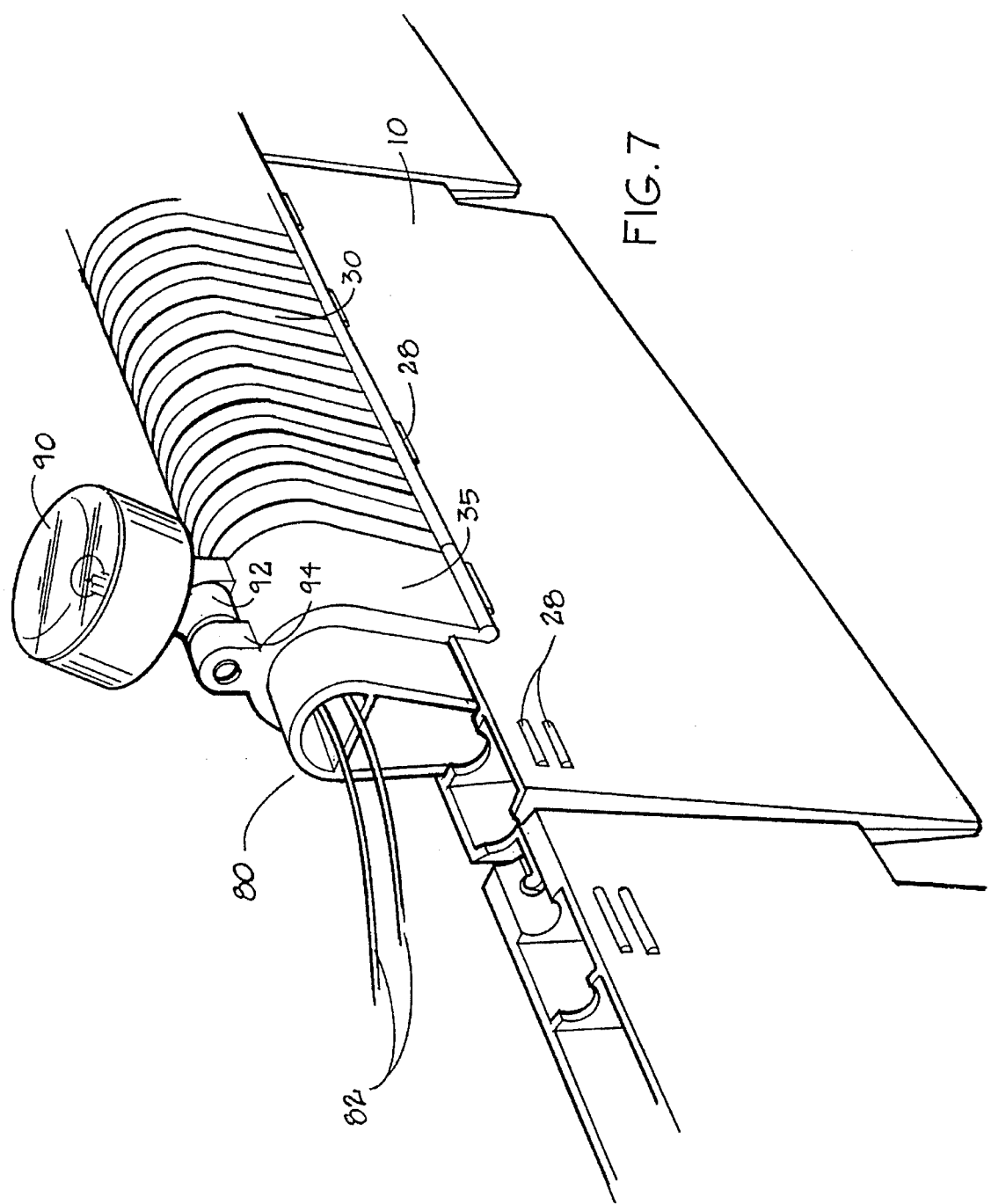
FIG. 7 is a perspective view of the insertion structure with an illumination device and cover installed.

As shown in FIG. 7 the electrical wiring 82 as supported by support piece 80 may be used for the attachment of illumination devices such as edging lamp 90 which is attached to the modified cover 35. In this manner, divider 10 has the cover 30 attached to the tabs 28 with or without the water tubes wherein this embodiment illustrates the use of the lamp to highlight items surrounding the edging device 10. The lamp 90 which is coupled to the modified cover 35 has a rotatable base 92 pivotally connected to the modified cover 35 by pinion base 94.

Figure 8:
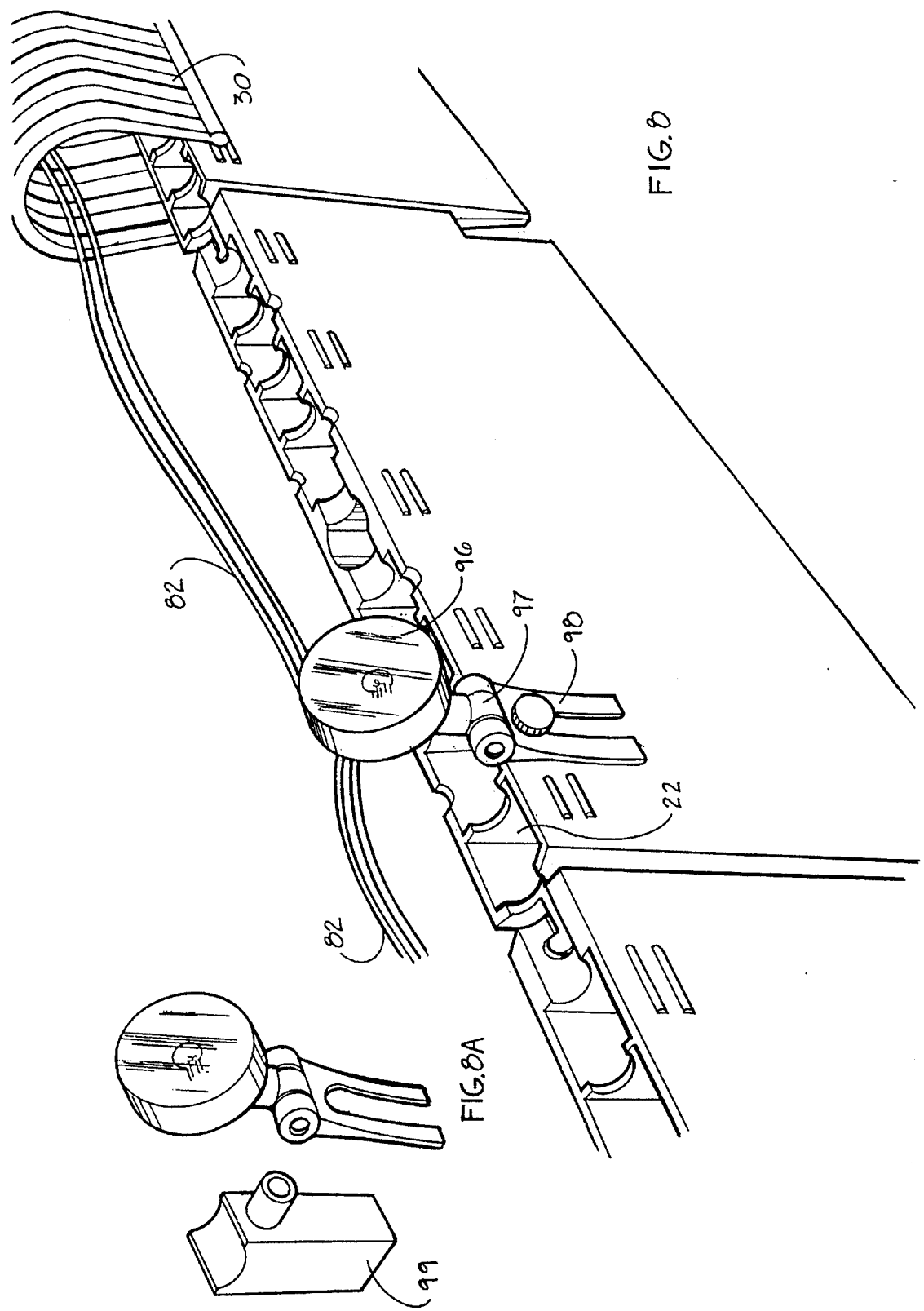
FIG. 8 is a perspective view of the insertion structure with an illumination lamp placed in one of the open chambers.
Figure 9:
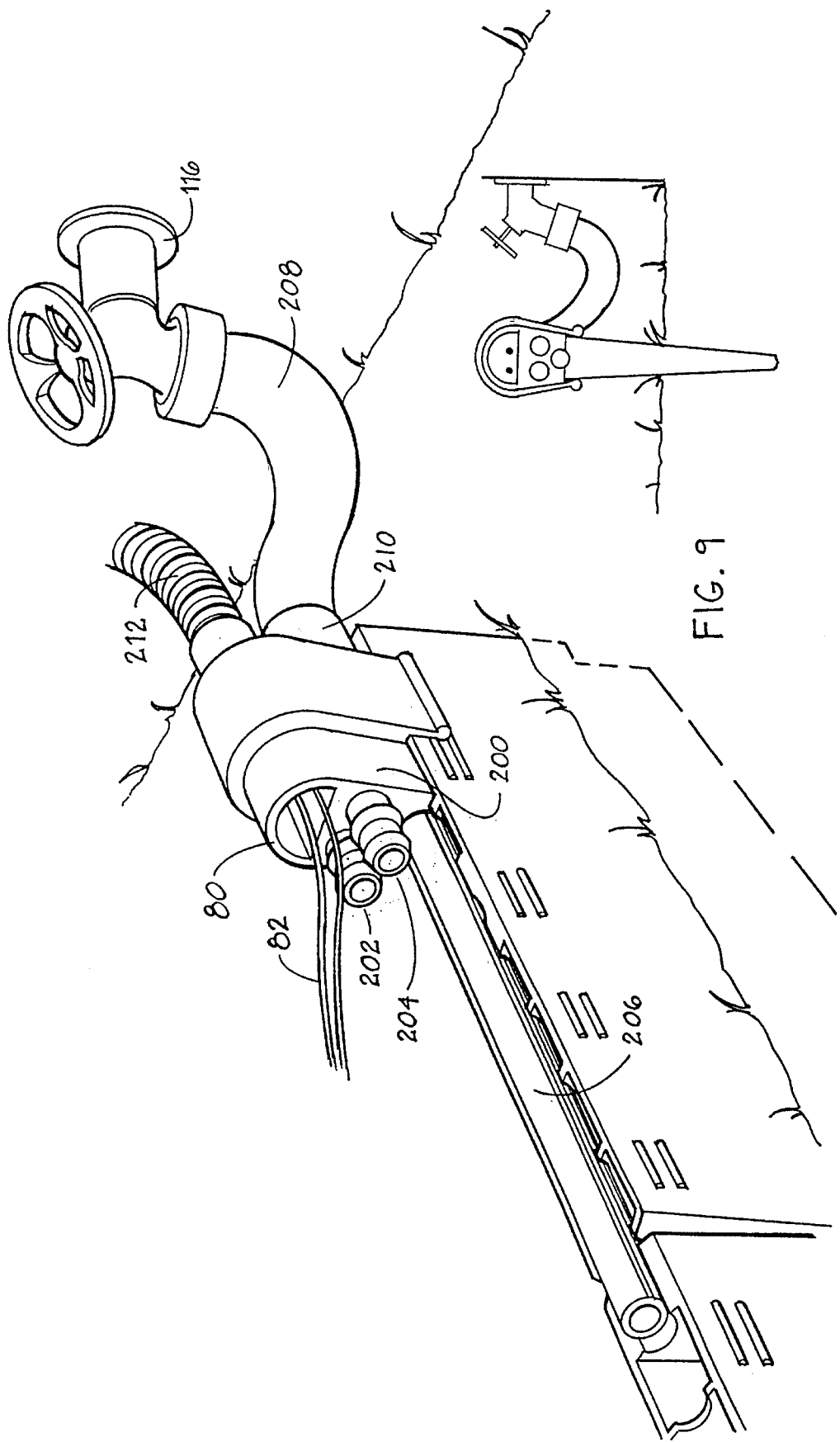
FIG. 9 is a perspective view of the insertion chamber having a water and electrical connection tube.

As shown in FIG. 8 another embodiment of the illumination device includes a lamp 96 having a base 97 which is rotatably coupled to a support 98 which allows for attachment over the aforementioned outlet shown by numeral 60 on FIG. 4 or by attachment to a holding plug 99 having a form for fitting within aperture 22. The lamp 96 may be wired in series shown by wires 82 and the cover 30 as shown in a retracted position but may be placed adjacent to the lamp 96 with a small cutout of the cover 30 so as to accommodate holder 99. Coupling to an electrical connection is shown in FIG. 9. A faucet 116 is coupled to connector 200 having three outlets such as upper outlet 202, outlet 204 and 206 which fits over a lower outlet, not shown. As previously mentioned, a conventional flexible conduit 208 couples faucet 116 to a fastening end 210 of the coupling device 200. The electrical wiring 82 is positioned along a plastic sleeve 80 with flexible conduit 212 available for positioning underground or for placement adjacent to an electrical outlet or control system as illustrated in FIG. 1.

Figure 10:
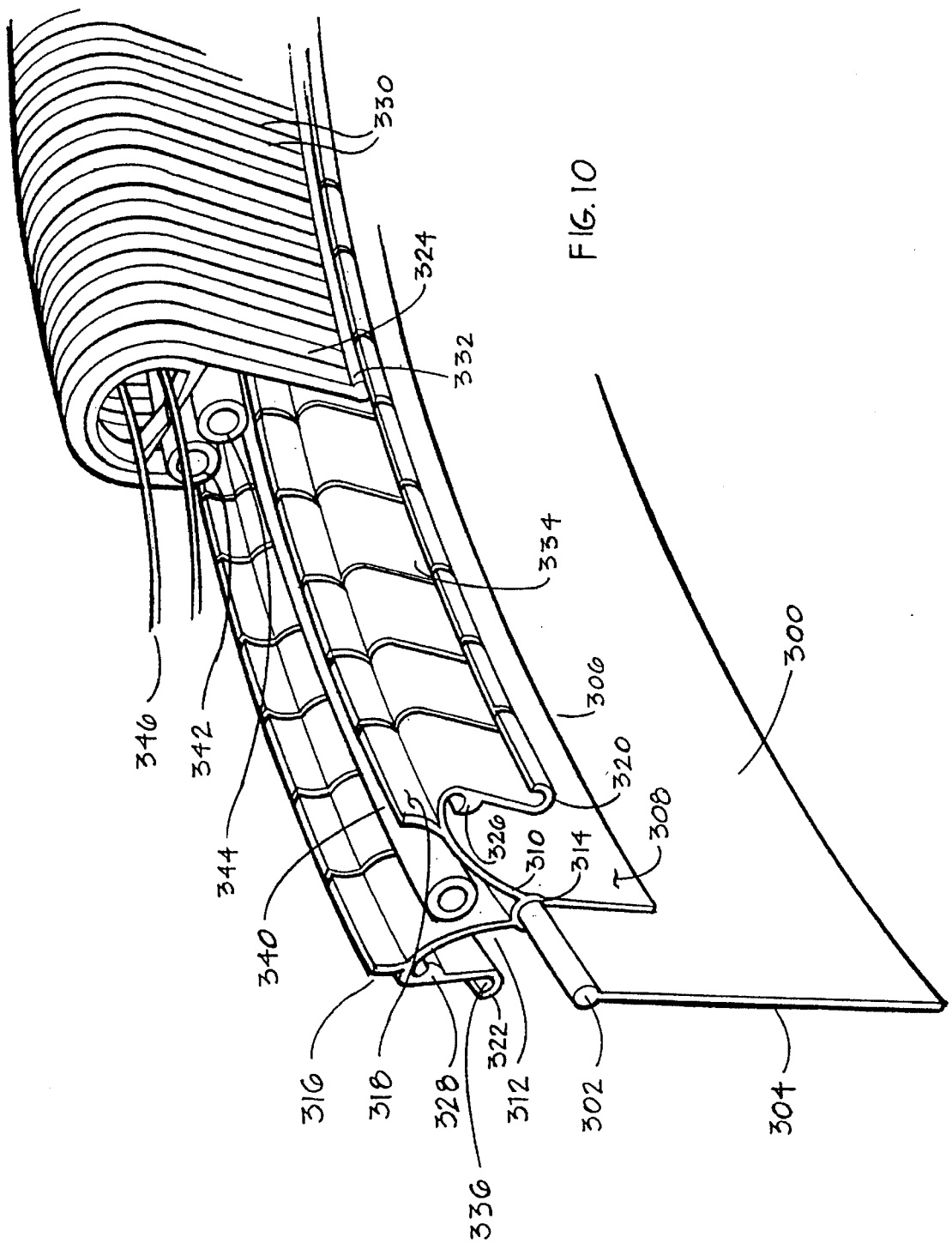
FIG. 10 is a perspective view of a second embodiment of the instant invention having a conduit placed on top of a flat edge divider.

Now referring to FIG. 10 shown is a second embodiment of the instant invention in which a conventional divider 300 is illustrated having an enlarged tubular shaped upper section 302 extending longitudinally along the length of the divider with a side wall 304 depending downwardly therefrom, a portion of which is available for insertion into the ground. In this embodiment an attachment is made to the tubular bead 302 by use of flexible structure 306 which is formed from a piece of extruded plastic having a first member 310 and a second member 312 demarcated by a cross brace along chamber 314 which is operatively associated with the upper portion 302 wherein members 312 and 310 are spaced apart along lower portion 308 allowing insertion of tubular bead 302 into chamber 314. As shown by way of illustration, first member 310 and second member 312 extend upwardly having raised tabs 316 and 318 respectively with the side wall extending downwardly forming locking lip 320 and 322. The locking lip 320 and 322 are receptive to cover 324 wherein the cover 324 engages each lip so as to releasably secure the cover in position. Locking lip 320 and 322 are biased outward by inwardly facing locking tabs 326 and 328, used for coupling to V-shaped dividers described later in this specification. In this manner, cover 324 is formed from a shape and size similar to the plastic electrical conduit known as "smurf" used as a substitute for metal electrical conduit. The plastic cover has a plurality of ridges 330 which allow the cover minimal flexibility providing a fairly straight divider yet sufficient flexibility in order to accommodate curves or bends necessary when outlining a lawn, garden, or driveway which is commonly edged by the use of landscape edging devices. The cover 324 causes an inward flexation of locking lips 320 and 322 with a lower edge 332 of the cover 324 engaging an inner surface 334 and 336 of the locking lips 320 and 322 respectively. This inward biasing of the cover 324 meets a resistance by locking tabs 326 and 328 securing the cover 324 in position. As set forth in the previous embodiment, the device includes the ability to provide a decorative edging and provide a passageway for multiple water tubes 340, 342 and 344. In addition, the cover 324 allows an open aperture for placement of electrical wires 346 as previously described.

Figure 11:
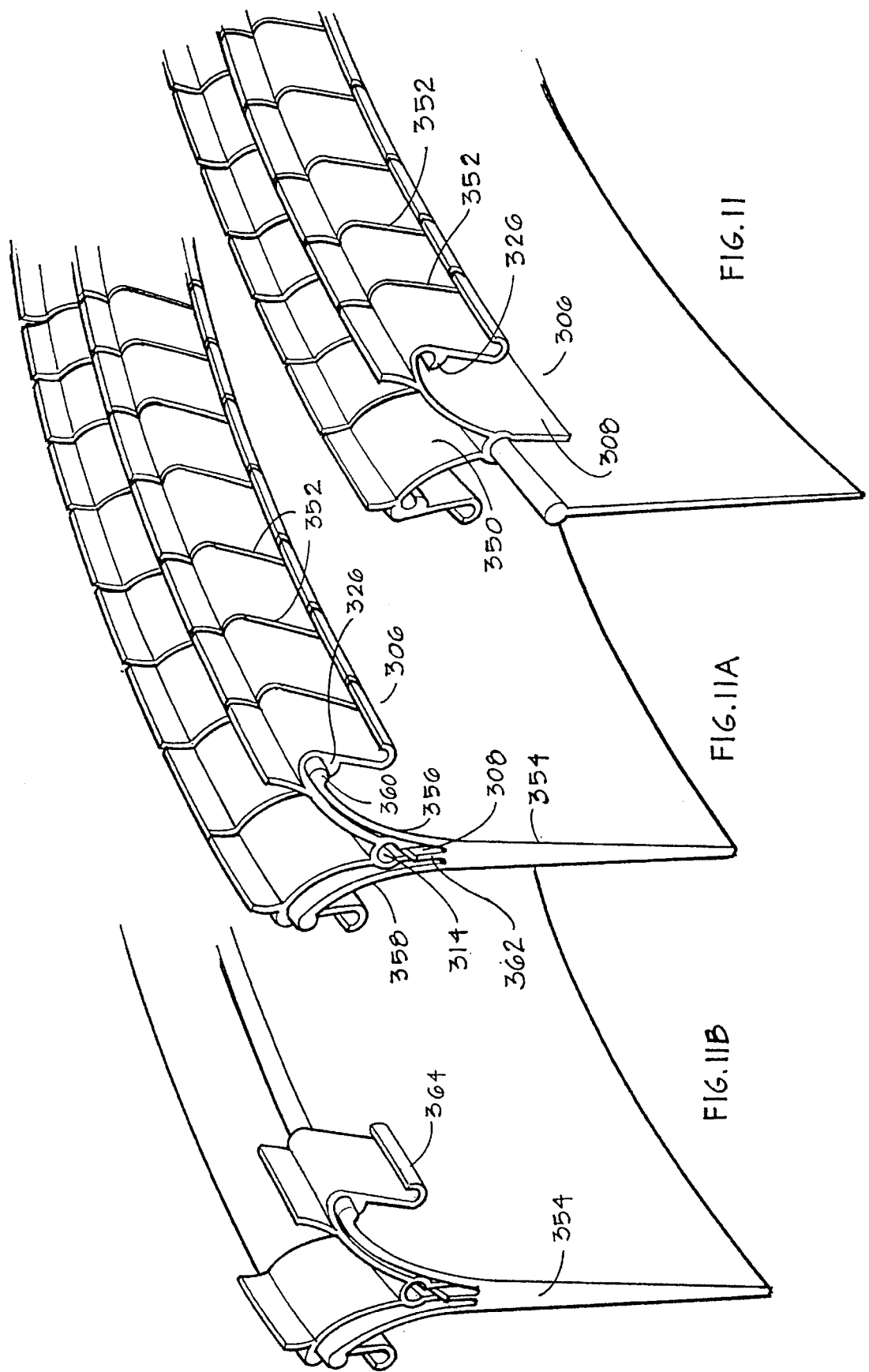
FIG. 11 is a perspective view of the conduit on a flat edge divider.

Referring to FIG. 11 a conduit 306 is shown without the cover or water tubes wherein an upper portion 350 is split into sections by the removal of material along slots 352 which allow the conduit 306 to flex in a similar manner to the aforementioned cover. The individual slots do not include the lower section 308 thereby allowing the conduit to be installed as a single piece and easily trimmed by simply cutting the lower section 308 so as to continue the slit 352. As shown in FIG. 11A the conduit 306 is mounted on a V-shaped divider 354 having a first outwardly extending riser 356 and a second extending riser 358. On the top of the first extending riser 356 is an enlarged end 360 which fits within the locking tab 326 so as to engage the conduit 306. It is noted that legs 308 with chamber 314 are placed about a center tab 362 used with a V-shaped divider. The individual slits 352 provider for flexibility and ease of installation so the device can be simply customized. As shown in FIG. 11B a single section 364 is shown by way of illustration as a separate component placed along the V-shaped divider 354 used to lessen the expense of installation should the installer wish to separate the device along slits so as to provide cover attachment at spaced apart intervals.

Figure 12:
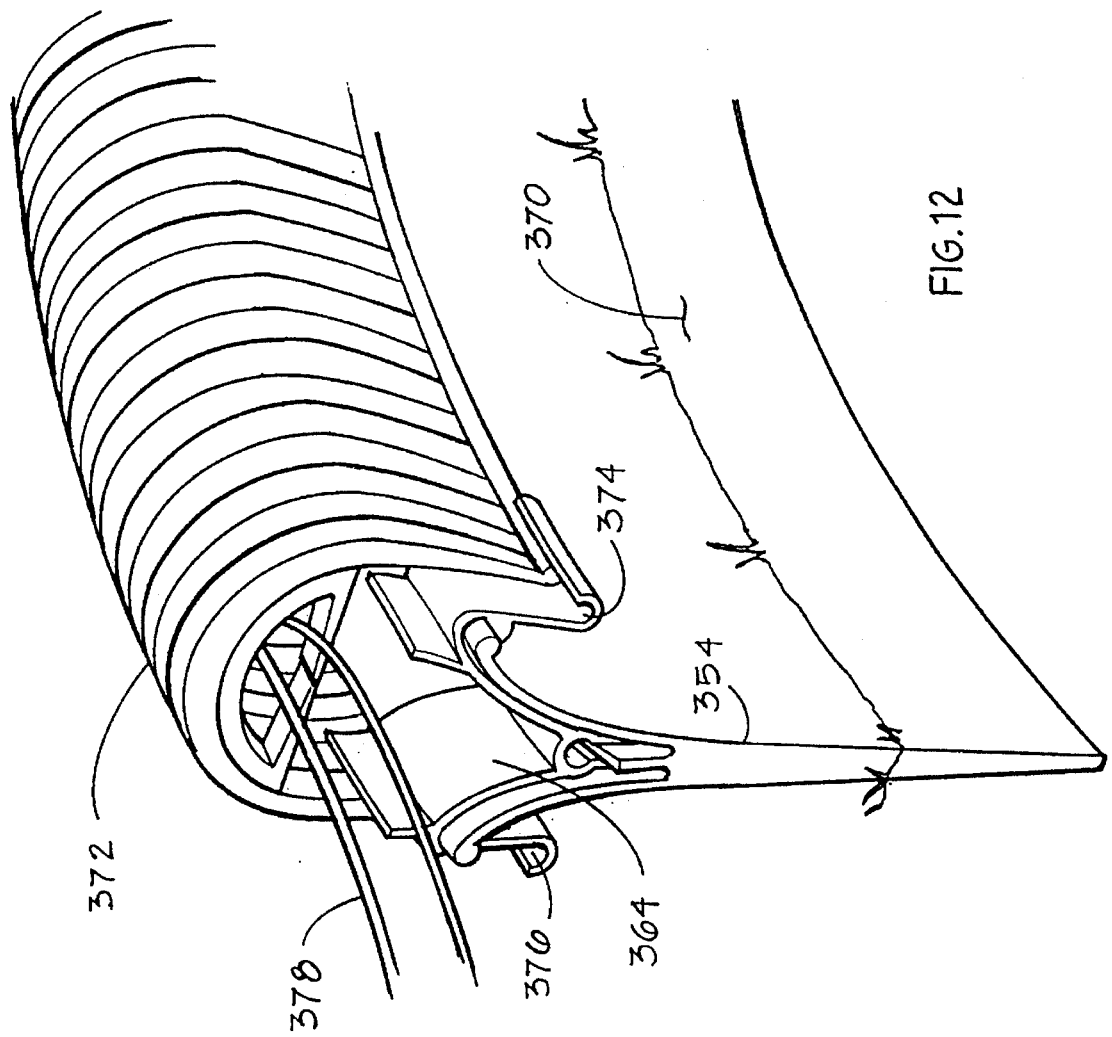
FIG. 12 illustrates a conduit placed on a V-shaped divider with a cover installed.

Referring to FIG. 12 the individual section 364 is shown on the V-shaped divider placed within the ground 370 wherein a cover 372 is attached to the latching sections 374 and 376 of the device only along the end portion of the divider 354. Electrical wires 378 are shown along an upper portion of the cover 372.

FIG. 13 is an enhanced view of FIG. 12 with the cover 372 in position over section 364 with a plurality of water tubes 380 in position beneath riser tabs 316 and 318 so as to maintain the water tubes 380 in a centrally disposed position. Again wires 378 are placed along an upper portion of the cover 372 by wire hanger 382.

Referring to FIG. 14 a junction may be provided in a similar manner as previously described. In this embodiment coupling 390 is substantially U-shaped and positioned adjacent to cover 372. Coupling 390 includes a support block 392 shown in this embodiment providing a tee for outlet 394, shown with plug 396, and an upper outlet 398 available for placement of a plug 396, nozzle 400 having a thin aperture 402 for dispersion of water over a distance, or a shower nozzle having an enlarged aperture 406 capable of gently distributing water over a short distance. The block 392 includes a continuation for water shown by attached tube 408 slid over crimp outlet 410, the crimped outlet having a plurality of ridges so as to engage an inner surface of the water tube 408. The block 392 has an inner side wall which engages an inner surface of tabs 318 and 316 and an outer wall 412 with a lower lip 414 which engages the latch 374 of the coupling device 364.

Shown in FIG. 15 is a modified cover 416 adjacent to cover 372 mounted on edging 354 having a illumination lamp 418 which is coupled to the modified cover 416 by pivot 420 allowing the base 422 of the lamp 418 to rotate so as to provide an adjustability for the direction of illumination.

Shown in FIG. 16 depicts a manual water coupling 422 for use with the instant invention. By way of illustration water coupling 422 operates as a remote water adjustment block having a base 424 with a plurality of flow through pipes 426, 428 and 430 which are controlled by hand valves 432, 434 and 436 respectively. The hand valves permit control of water flow through the individual pipes by turning the valves. This is most beneficial in instances where a particular flower bed may require only minimal watering on one side of the edging device and a large volume of water to be directed to the other side. For this reason, one valve may be adjusted so as to reduce the flow to the flower bed effectively increasing the flow to the lawn area.

Referring to FIG. 17 a water coupler 440 is placed within the vertical barrier 354 with a spigot 442 placed along a side surface of the water coupler having a manual actuated valve 444 used to turn water on or off for connection to a conventional hose 446 coupled to the spigot 442 by thread coupling 447. It is noted that the water coupler 440 is surrounded by cover 448 and 448' providing a uniform shape to the cover with said water coupling having an upper surface 450 which assimilates the upper surface of said covers.

Figure 18A:
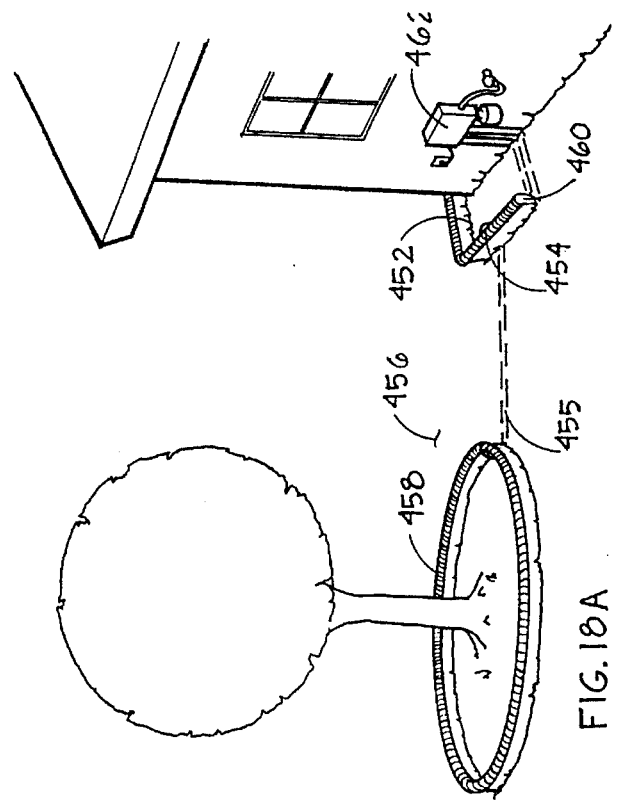
FIG. 18A shows a pictorial view of the electrical conduit installed in a residential application.
Figure 18:
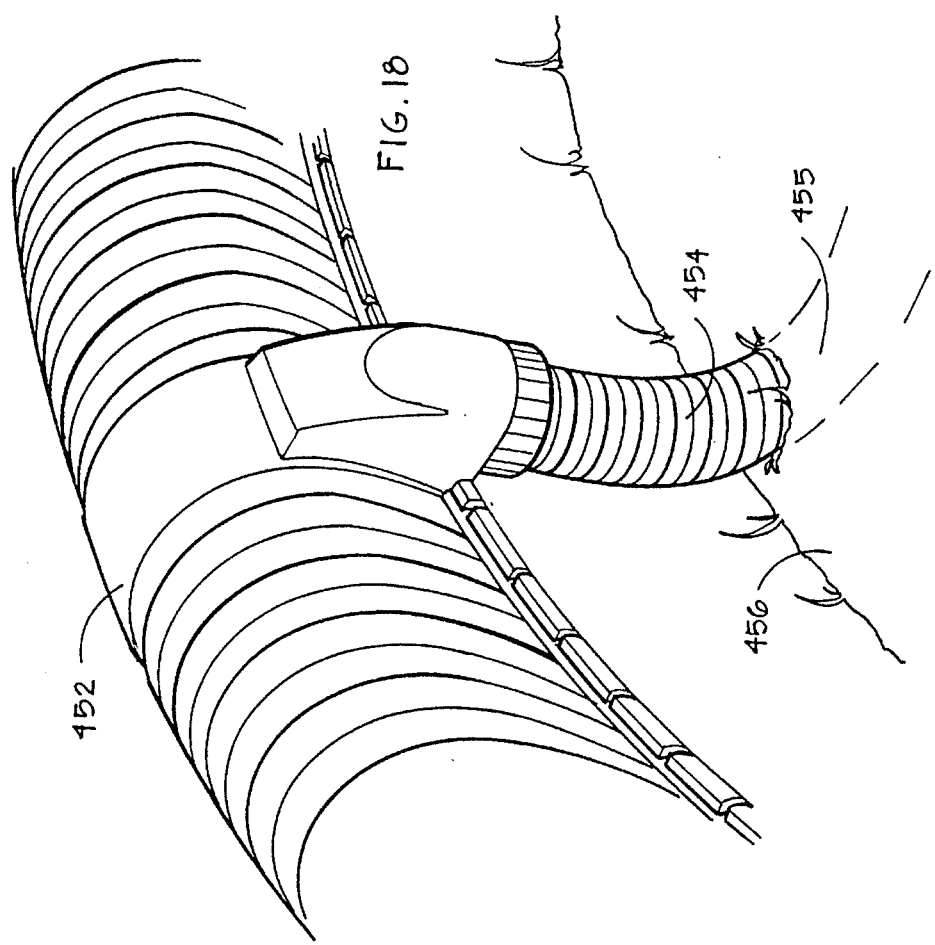
FIG. 18 is an electrical coupling for use with a conduit.
Figure 22:
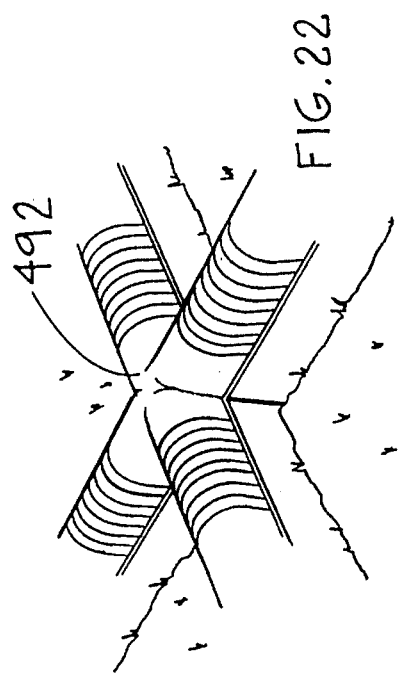
FIG. 22 is a perspective view of a cross-juncture.
Figure 24:
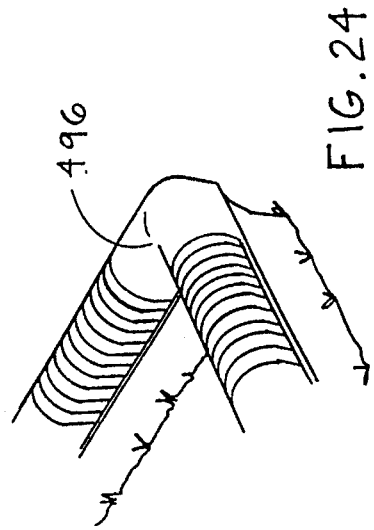
FIG. 24 is a perspective view of an elbow-juncture.
Figure 21:
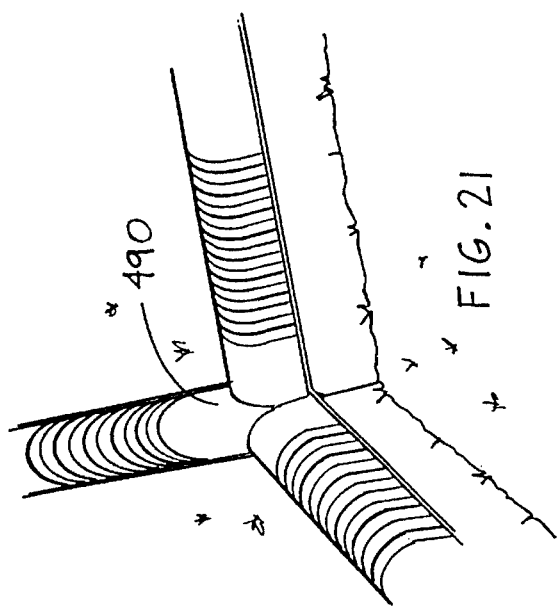
FIG. 21 is a perspective view of a Y-juncture.
Figure 23:
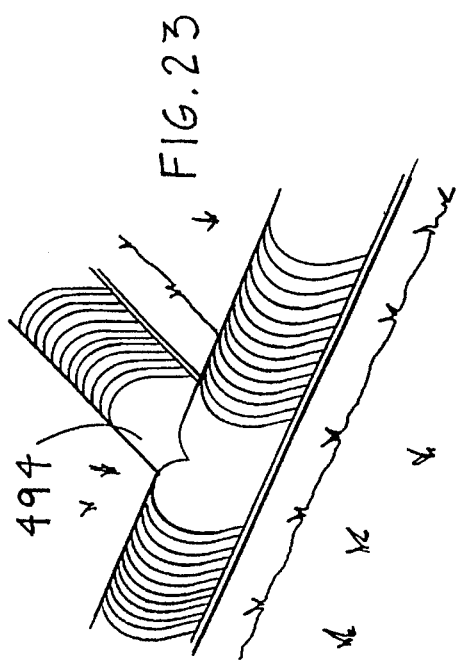
FIG. 23 is a perspective view of a T-juncture.

FIG. 18 sets forth an electrical coupler 452 used to transfer electrical and/or water components to a remote location which is depicted in FIG. 18A wherein conduit 454 is coupled by attachment coupling 452 and sent beneath the ground 456 as shown by hidden lines 455 to a remote position as shown by tree outline 458. This illustration sets forth a means for coupling the edging apparatus across a lawn surface where it is not desirable to have an electrical and/or watering conduit impede the walkway. This conduit 452 may be placed on the end 460 of a divider allowing submersion of the coupling for direct connection to the control unit 462.

FIG. 19 sets forth an end insertion wall 464 which may be used adjacent to a barrier 466 having a lower section 468 placed perpendicular to the vertical barrier of the divider 466 so as to prevent movement along a longitudinal length of the divider. The insertion wall 464 has a plurality of dislodgable connections 470 which may be broken off along any one of the pre-stressed divider lines 472 allowing for the positioning at an appropriate depth based upon soil condition. The end provides both electrical conduit 474 connection as well as water conduit connection 476. As shown in FIG. 19A, the electrical conduit 474 may house a plurality of wires 478 while the water conduit 476 includes separate tubes or a single coupling for a division to water outlet 480.

FIG. 20 sets forth an optional sensor 482 that may be inserted into the illumination lamp coupling allowing the sensors to be discretely placed around the barrier of a home 484 as shown in FIG. 20A at a level that may detect movement close to the ground such as for the prevention of unwanted animals in areas where household pets are endangered by wayward wild animals. The sensor 42 is coupled to the electrical bracket 486 in a similar manner as the electric light with a pinion 488 allowing for directional placement of the sensor.

Now referring to FIGS. 21 through 24 shown are various couplings that may be made with the invention such as a Y-coupling 490 available for the intersection of three passageways, cross coupling 492, T-coupling 494 and right angle elbow coupling 496.

Now referring to FIG. 25 shown is yet another embodiment of the instant invention for use on dividers 500 having an enlarged tubular top 502 which may not have the ability to carry water through a centrally disposed aperture 504. In this embodiment, conduit 506 may be attached to the divider 500 by use of an enlarged lower section forming a circular chamber for engagement on an outer surface of said tube 502. This conduit is particularly advantageous for those dividers that had originally used the center aperture 504 for carrying of water but lost the structural integrity of the device for carrying water. In this manner, conduit 506 couples to the divider forming a passageway 508 in a manner similarly described for placement of water pipe 510 and electrical wire 512. As shown in FIG. 25A the conduit may be attached by use of self-tapping screws 514 which can be inserted in the passageway before the water tubes 510 are placed therein. The cover 516 may then be placed onto the conduit in a similar manner as previously described with a lower end of the cover engaging a latching lip 518 of the conduit. Shown in FIG. 25B, the conduit 506 may accommodate electrical connections 520 as well as water connections 522 converting the non-functional divider 500 into a multi-purpose carrier of water and electricity with a cover 516 enhancing the ornamental design of the apparatus.

FIG. 26 illustrates yet another embodiment of the instant invention wherein a conduit 530 may be placed on a solid surface 532 such as the framing of a garage door. This conduit may be attached directly to a flat surface by the use of screws or nails 534 placed along an inner surface of the conduit 530 which forms a passageway 536 for water tubes 540 and electrical wires 542. As with the previous embodiments, the cover 544 attaches to the locking lip 546 maintaining the cover 544 in a releasably secured position.

Figure 28:
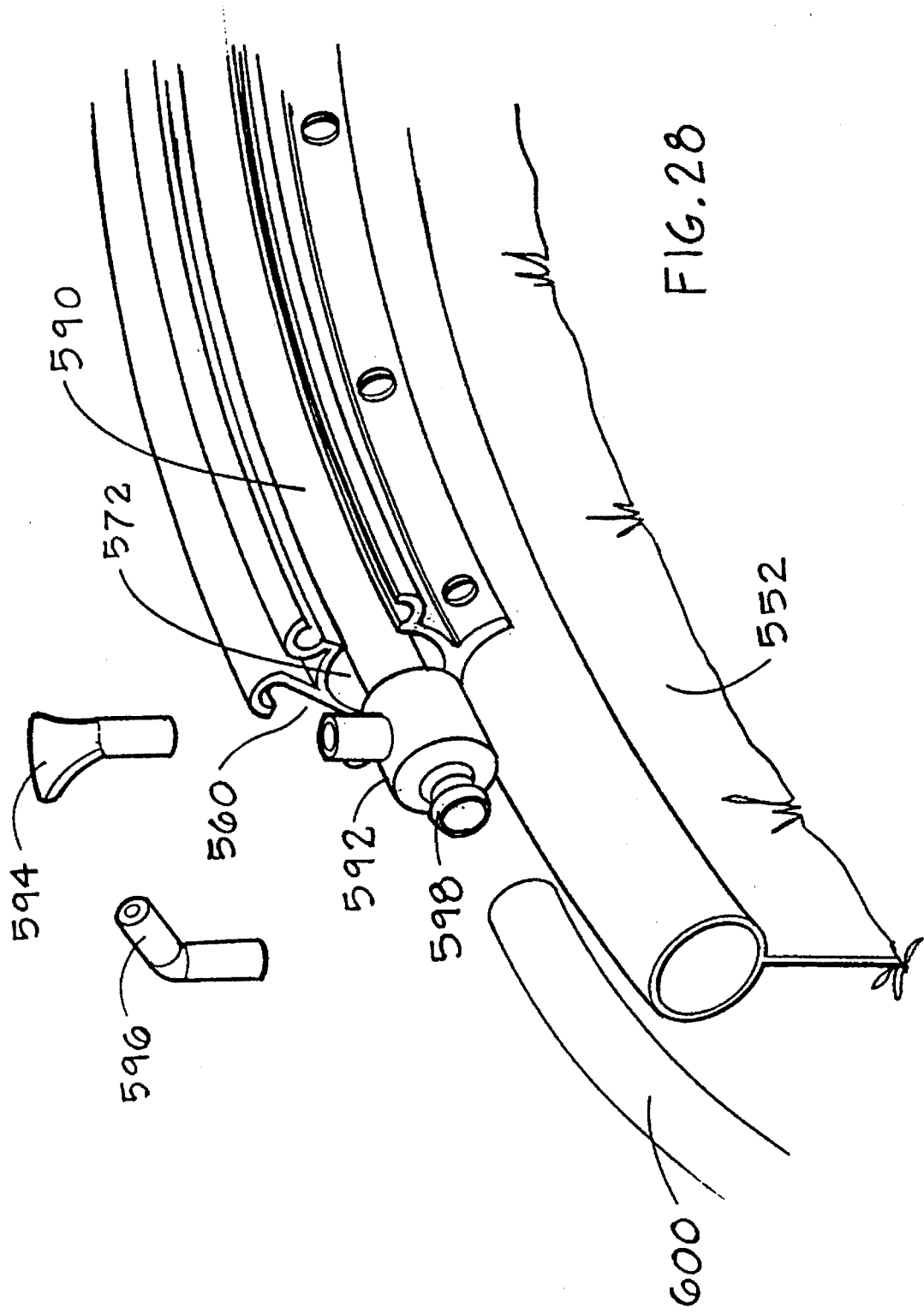
FIG. 28 is FIG. 27 with a water tube mounted therein.

Now referring to FIGS. 27 and 27A shown is yet another embodiment of the instant invention having a conduit 550 which is securable to a conventional divider 552 by use of a plurality of apertures 554 disposed along a side surface 556 of the conduit 550 for placement of attachment screws 558. In this embodiment a holder for a conventional flexible garden hose is formed by use of opening aperture 560 having an upper 562 and lower 564 forming a C-shaped section with a backing surface 566 which provides support of a garden hose 570 in said aperture. The garden hose has a plurality of holes placed therein so as to provide distribution of water over an elongated distance. Similarly, a second aperture 572 is provided having an upper 574 and lower 576 U-shaped surface for insertion of a second garden hose 580 thereby providing sprinkling on both sides of the device. Unique to this invention is the ability to place a water tube 590 as shown in FIG. 28 within the open aperture 572 allowing the inner cavity to carry the water tube 590 wherein water couplers 592 may be utilized for connection of spray nozzles 594 and/or 596. The water coupler includes an outlet 598 for attachment to a second water tube 600 allowing continuation of the water flow to another location. Although not shown, but shown in FIG. 27A the hoses 570 and 580 may be placed within the aperture 560 and 572 thereby allowing sprinkling on either side of the barrier 552 as well as a directed spray such as provided by the water coupler 592 used in conjunction with the water nozzles.

FIG. 29 sets forth a stake 600 for use in coupling a flat water hose 602 wherein the stake is insertable into the ground 604. It has a backing surface 606 with a first side 608 and a second side 610 forming a U-shaped section for securing the hose member 602 into the stake member. The stake member thereby maintaining the hose 602 in a fixed position at a slight angle as shown in FIG. 29A.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An edging apparatus comprising: an insertion structure having two rectangular side walls forming a wedge shape bounded by a first and second end wall, each said end wall having an enlarged upper end narrowing to a singular edge assimilating said wedge shape, said side walls separated along an upper portion by a first distance with a longitudinally disposed cutout forming an upright passageway between said first and second end walls, said upper portion including a plurality of vertical chambers disposed along the length thereof; a circular shaped cover having an inner surface and an outer surface; and a means for coupling said cover to said insertion structure, said inner surface and said passageway forming a horizontally disposed chamber when said cover is coupled thereto.

2. The edging system according to claim 1 wherein said first end wall includes a vertically disposed groove and said second end wall includes a vertically disposed tongue, said tongue of said second end wall selectively slidable into a groove of an adjacent insertion structure for releasable retention thereby.

3. The edging system according to claim 1 wherein said first and second end wall are chamfered.

4. The edging system according to claim 1 wherein one of said vertical chambers is circular, said circular chamber receptive to an insertion of a circular shaped handle for use in maintaining said insertion structure in an upright position during installation.

5. The edging system according to claim 1 including a water coupler means, said water coupler means having an upper portion with at least one water inlet and one water outlet and a lower portion releasably securable into one of said vertical chambers.

6. The edging system according to claim 5 wherein said water coupler means includes a manual valve means for controlling the flow of water therethrough.

7. The edging system according to claim 5 wherein said water outlet of said water coupler means is receptive to a nozzle means for the controlled distribution of water.

8. The edging system according to claim 1 wherein said means for coupling is further defined as a plurality of alignment tabs disposed on each said side wall for engaging a free end of said cover.

9. The edging system according to claim 1 including a electrical hanger formed from a semi-circular shaped piece of plastic conforming to an inner side surface of said cover with a horizontally disposed cross member, said hanger positioning electrical wires along an upper portion of the inner surface of said cover.

10. The edging system according to claim 1 including a lamp coupler means, said lamp coupler means having an upper portion securing an illumination lamp in a pivotable position and a lower portion releasably securable into one of said vertical chambers.

\* \* \* \* \*